United States Patent
Briceno et al.

(10) Patent No.: US 11,428,310 B2
(45) Date of Patent: Aug. 30, 2022

(54) STEPPED SPINDLE

(71) Applicant: Allison Transmission, Inc., Indianapolis, IN (US)

(72) Inventors: Jorge F. Briceno, Brownsburg, IN (US); Isaac Mock, Martinsville, IN (US); Douglas Burchett, Martinsville, IN (US)

(73) Assignee: Allison Transmission, Inc., Indianapolis, IN (US)

( * ) Notice: Subject to any disclaimer, the term of this patent is extended or adjusted under 35 U.S.C. 154(b) by 0 days.

(21) Appl. No.: 16/429,598

(22) Filed: Jun. 3, 2019

(65) Prior Publication Data
US 2020/0378490 A1 Dec. 3, 2020

(51) Int. Cl.
*F16H 57/08* (2006.01)
*F16H 57/04* (2010.01)
(Continued)

(52) U.S. Cl.
CPC ......... *F16H 57/082* (2013.01); *F16H 57/021* (2013.01); *F16H 57/023* (2013.01);
(Continued)

(58) Field of Classification Search
CPC .. F16H 57/08–2057/085; F16H 1/2809; F16H 1/2836; F16H 57/021;
(Continued)

(56) References Cited

U.S. PATENT DOCUMENTS 3,964,334 A * 6/1976 Hicks .................... F16H 1/2836
475/347
4,091,688 A 5/1978 Huffman
(Continued)

FOREIGN PATENT DOCUMENTS

DE 102009001985 A1 10/2010
DE 102017112341 A1 8/2018
(Continued)

OTHER PUBLICATIONS

Oerlikeon Fairfield, "Torque-Hub(registered) Planetary Final Drive 11000 Series with Bolted Ring Gear Service Manual", Planetary Final Drive Service Manual, www.oerlikon.com/fairfield, Jun. 24, 2014, pp. 1-59.

*Primary Examiner* — Ernesto A Suarez
*Assistant Examiner* — James J Taylor, II
(74) *Attorney, Agent, or Firm* — Faegre Drinker Biddle & Reath LLP

(57) ABSTRACT

A rotatable transmission component rotatable about an axis of rotation includes a first mounting member spaced apart from a second mounting member and a spindle extending from the first mounting member to the second mounting member. An axial location of the spindle between the first and second mounting members is maintained by interference connections between the spindle and the first and second mounting members. An outer diameter of a first end of the spindle is larger than an outer diameter of a second end of the spindle. The rotatable transmission component may be a planet carrier, and a planet gear may be supported on the spindle.

34 Claims, 14 Drawing Sheets

(51) Int. Cl.
  *F16H 57/021* (2012.01)
  *F16H 57/023* (2012.01)
(52) U.S. Cl.
  CPC ...... *F16H 57/0479* (2013.01); *F16C 2361/61* (2013.01); *F16H 2057/085* (2013.01)
(58) Field of Classification Search
  CPC .............. F16H 57/023; F16H 57/0479; F16H 57/0471; F16C 2361/61
  See application file for complete search history.

(56) References Cited

U.S. PATENT DOCUMENTS

| | | | |
|---|---|---|---|
| 4,480,492 A * | 11/1984 | Fujioka | F16H 57/0427 184/6.12 |
| 4,756,212 A | 7/1988 | Fuehrer | |
| 4,950,213 A | 8/1990 | Morisawa | |
| 5,593,362 A * | 1/1997 | Mizuta | F16H 57/082 475/348 |
| 5,616,097 A | 4/1997 | Dammon | |
| 8,216,108 B2 | 7/2012 | Montestruc | |
| 8,241,172 B2 * | 8/2012 | Lahtinen | F16H 57/082 475/348 |
| 8,506,446 B2 | 8/2013 | Minadeo et al. | |
| 8,540,598 B2 | 9/2013 | Wakida et al. | |
| 8,550,955 B2 | 10/2013 | Erno et al. | |
| 8,758,190 B2 | 6/2014 | Montestruc | |
| 8,777,802 B2 | 7/2014 | Erno et al. | |
| 9,714,701 B2 * | 7/2017 | Mitsch | F16H 57/0006 |
| 9,873,565 B2 * | 1/2018 | Itoh | F16H 57/0479 |
| 9,927,021 B1 | 3/2018 | Vorberger et al. | |
| 10,054,216 B2 * | 8/2018 | Johnson | F16H 57/082 |
| 10,274,071 B2 * | 4/2019 | Niergarth | F16C 27/045 |
| 10,436,249 B2 * | 10/2019 | Hoelzl | F16C 33/1055 |
| 2003/0181283 A1 | 9/2003 | Chen | |
| 2010/0313408 A1 * | 12/2010 | Morlo | B21K 25/00 29/525.01 |
| 2014/0243144 A1 * | 8/2014 | Pierce | F16H 57/082 475/331 |
| 2015/0105212 A1 | 4/2015 | Graham et al. | |
| 2015/0330498 A1 | 11/2015 | Carlino et al. | |
| 2016/0319928 A1 * | 11/2016 | Van Eyndhoven | F16H 57/082 |
| 2016/0334007 A1 * | 11/2016 | Lang | F16H 57/082 |
| 2016/0341303 A1 * | 11/2016 | Smet | F16C 33/6677 |
| 2019/0024695 A1 | 1/2019 | Koczwara et al. | |
| 2019/0331213 A1 * | 10/2019 | Aigner | F16H 57/0018 |

FOREIGN PATENT DOCUMENTS

| | | |
|---|---|---|
| EP | 0238921 B1 | 10/1989 |
| EP | 2438327 B1 | 8/2013 |
| WO | 2007/088117 A1 | 8/2007 |
| WO | 2015/135713 A2 | 9/2015 |

* cited by examiner

STEPPED SPINDLE

FIELD OF THE DISCLOSURE

The present disclosure relates to a rotating transmission component and, in particular, to a spindle supported by a rotating transmission component in a multi-speed transmission.

BACKGROUND OF THE DISCLOSURE

Known multi-speed transmissions use a plurality of interconnectors and operative transmission components to achieve a plurality of forward and reverse speed ratios between at least one input member and at least one output member operatively connected to the multi-speed transmission. Any of the operative transmission components may include a rotatable transmission component, such as, for example, a planet carrier assembly, supporting a spindle which in turn supports a planet gear. Typically, the spindle is retained in the rotatable transmission component using at least one retainer or deforming the ends of spindle.

SUMMARY OF THE DISCLOSURE

In an exemplary embodiment of the present disclosure, a planetary gearset is disclosed. The planetary gearset comprises a sun gear rotatable about a central axis and a planet carrier rotatable about the central axis. The planet carrier includes a central aperture for receiving the sun gear and a plurality of radial cavities spaced radially outwardly from the central axis. The plurality of radial cavities are defined between the first and second mounting members. The planetary gearset further comprises a plurality of planet gears supported on a respective spindle axially extending between the first and second mounting members of the planet carrier. The spindle extends continuously from a first end to a second end. The first end of the spindle has a first diameter and is coupled to the first mounting member through an interference fit connection with a corresponding aperture of the first mounting member. The second end of the spindle has a second diameter and is coupled to the second mounting member through an interference fit connection with a corresponding aperture of the second mounting member. The first diameter is larger than the second diameter.

In another exemplary embodiment of the present disclosure, a rotatable transmission component is disclosed. The rotatable transmission component comprises a base having a first mounting member and a second mounting member spaced apart from the first mounting member. The first and second mounting members are configured to rotate together about a central axis. The rotatable transmission component further comprises a spindle extending axially between the first and second mounting members. The spindle extends continuously from a first end to a second end. The first end of the spindle has a first diameter and is coupled to the first mounting member through an interference fit connection with a corresponding aperture of the first mounting member. The second end of the spindle has a second diameter and is coupled to the second mounting member through an interference fit connection with a corresponding aperture of the second mounting member. The first diameter is larger than the second diameter, and an axial location of the spindle between the first and second mounting members is maintained only by the interference fit connections between the spindle and the first and second mounting members.

In a further exemplary embodiment of the present disclosure, a method of assembling a rotatable transmission component is disclosed. The method comprises providing a planet carrier configured to rotate about a central axis and having a first mounting member spaced apart from a second mounting member. The first and second mounting members each include an aperture, the respective apertures being coaxial. The method further comprises providing a spindle extending continuously from a first end to a second end. The first end has a first diameter, and the second end has a second diameter larger than the first diameter. The method further comprises passing the first end of the spindle through the aperture of the second mounting member along a spindle insertion axis, inserting the first end of the spindle into the aperture of the first mounting member to a first insertion depth such that the first end of the spindle is coupled to the first mounting member through a first interference fit connection with the aperture of the first mounting member, and inserting the second end of the spindle into the aperture of the second mounting member to a second insertion depth such that the second end of the spindle is coupled to the second mounting member through a second interference fit connection with the aperture of the second mounting member.

In some instances throughout this disclosure and in the claims, numeric terminology, such as first, second, third, and fourth, is used in reference to various operative transmission components and other components and features. Such use is not intended to denote an ordering of the components. Rather, numeric terminology is used to assist the reader in identifying the component being referenced and should not be narrowly interpreted as providing a specific order of components.

BRIEF DESCRIPTION OF THE DRAWINGS

The above-mentioned and other features and advantages of this disclosure, and the manner of attaining them, will become more apparent and will be better understood by reference to the following description of exemplary embodiments taken in conjunction with the accompanying drawings, wherein.

Corresponding reference characters indicate corresponding parts throughout the several views. The exemplifications set out herein illustrate exemplary embodiments of the invention and such exemplifications are not to be construed as limiting the scope of the invention in any manner.

DETAILED DESCRIPTION OF THE DRAWINGS

Figure 1:
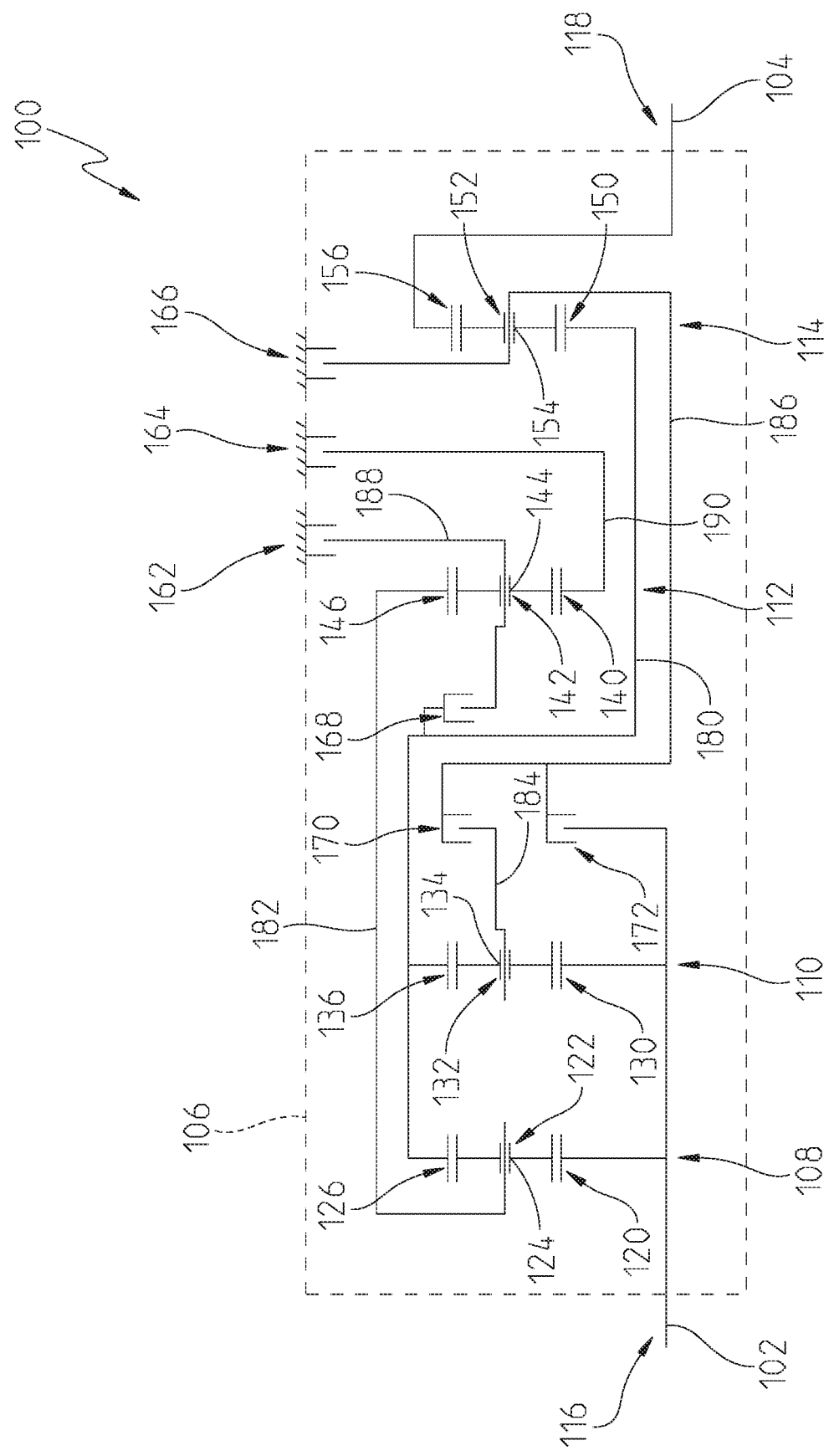
FIG. 1 is a diagrammatic view of an illustrative multi-speed transmission including four planetary gearsets, six selective couplers, and eight interconnectors.
Figure 2:
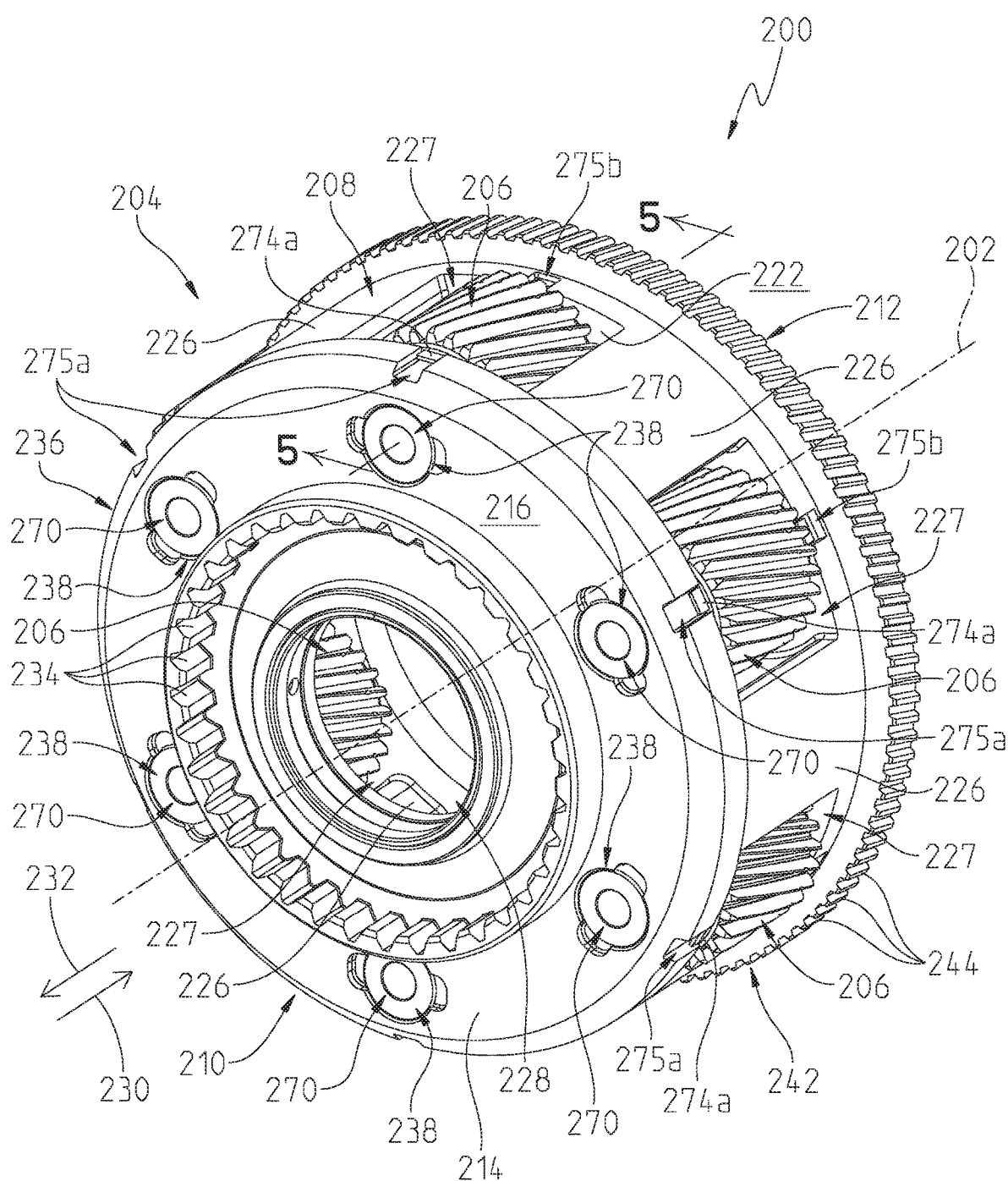
FIG. 2 is a perspective front view of an illustrative rotatable transmission component, illustratively a planet carrier assembly.
Figure 3:
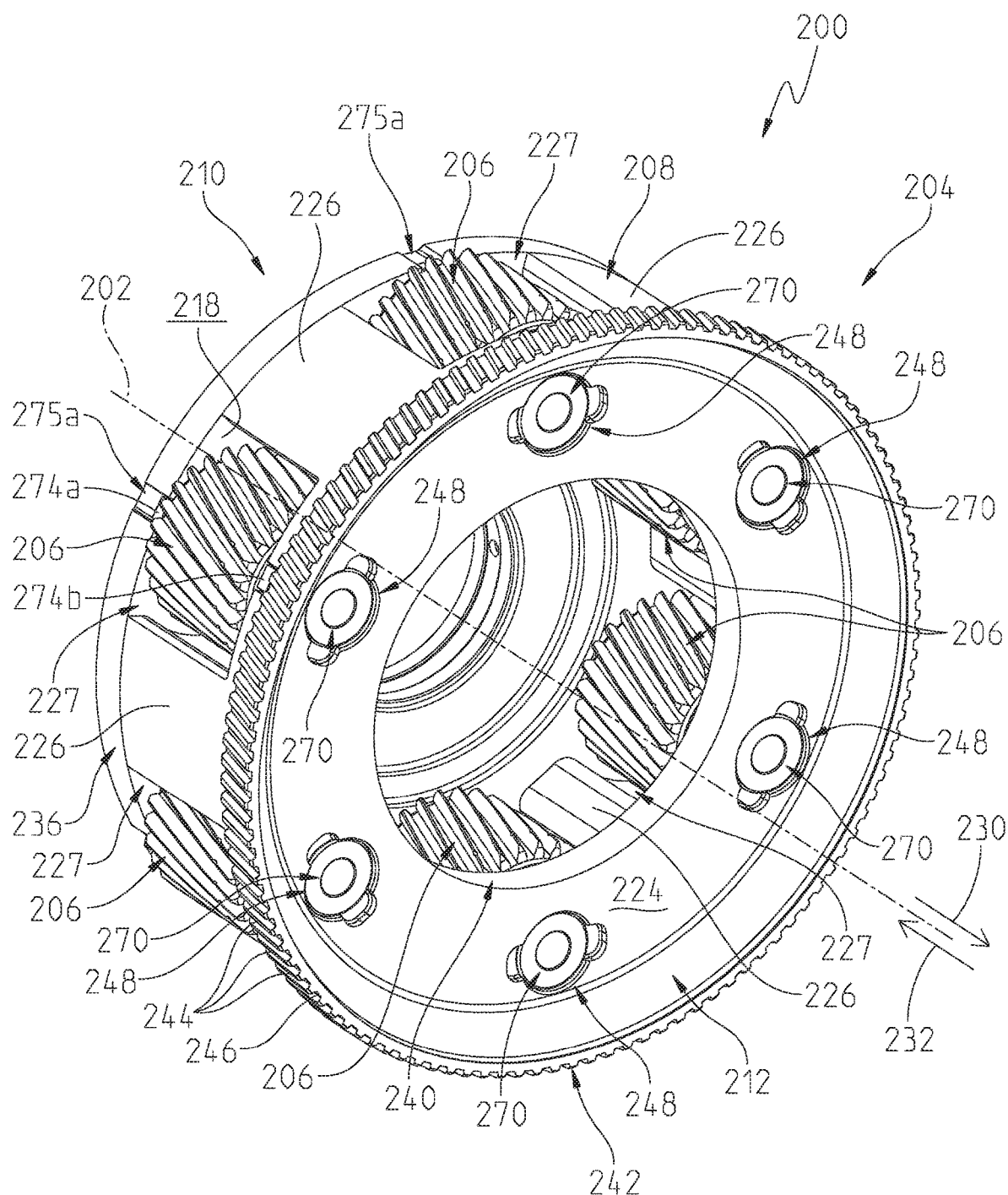
FIG. 3 is a perspective rear view of the planet carrier assembly of FIG. 2.

For the purposes of promoting an understanding of the principles of the present disclosure, reference is now made to the embodiments illustrated in the drawings, which are described below. The embodiments disclosed below are not intended to be exhaustive or limit the present disclosure to the precise form disclosed in the following detailed description. Rather, the embodiments are chosen and described so that others skilled in the art may utilize their teachings. Therefore, no limitation of the scope of the present disclosure is thereby intended. Corresponding reference characters indicate corresponding parts throughout the several views.

In the exemplary transmission embodiment, torque and rotational motion are transferred from an input member to an output member through a multi-speed transmission. To facilitate the transfer of torque and rotational motion to the output member at different selected gear ratios, the multi-speed transmission includes a plurality of operative transmission components. Simply put, an operative transmission component is a device or component that carries torque and rotational motion within the transmission. One or more parts of the operative transmission component may be rotatable to form a rotatable transmission component. Operative transmission components illustratively include selective couplers, interconnectors, sun gears, planet carrier assemblies, and ring gears.

A clutch is an example of a selective coupler. A clutch couples two or more rotating components to one another so that the two or more rotating components rotate together as a unit in an engaged configuration and permits relative rotation between the two or more rotating components in the disengaged position. Exemplary clutches may be shiftable friction-locked multi-disk clutches, shiftable form-locking claw or conical clutches, wet clutches, or any other known form of a clutch. The terms "couples", "coupled", "coupler" and variations thereof are used to include both arrangements wherein the two or more components are in direct physical contact and arrangements wherein the two or more components are not in direct contact with each other (e.g., the components are "coupled" via at least a third component), but yet still cooperate or interact with each other.

A second exemplary selective coupler is a brake. A brake couples one or more rotatable components to a stationary component to hold the one or more rotatable components stationary relative to the stationary component in the engaged configuration and permits rotation of the one or more components relative to the stationary component in the disengaged configuration. Exemplary brakes may be configured as shiftable-friction-locked disk brakes, shiftable friction-locked band brakes, shiftable form-locking claw or conical brakes, or any other known form of a brake.

Selective couplers may be actively controlled devices or passive devices. Exemplary actively controlled devices include hydraulically actuated clutch or brake elements and electrically actuated clutch or brake elements. Additional details regarding systems and methods for controlling selective couplers are disclosed in U.S. Pat. No. 9,625,007, the entirety of which is incorporated by reference.

In addition to coupling through selective couplers, various components of the disclosed transmission embodiments may be fixedly coupled together continuously throughout the operation of the disclosed transmissions. Components may be fixedly coupled together either permanently or removably. Components may be fixedly coupled together through spline connections, fasteners, welding, machined or formed functional portions of a unitary piece, interference fit connections, or other suitable methods of connecting components.

Interconnectors include one or more rotating components, such as shafts, drums, and other components fixedly coupled together. Interconnectors may further be fixedly coupled to one or more other operative transmission components.

FIG. 1 is a diagrammatic representation of an exemplary multi-speed transmission 100. Multi-speed transmission 100 includes an input member 102 and an output member 104. Each of input member 102 and output member 104 is rotatable relative to at least one stationary member 106. An exemplary input member 102 is an input shaft or other suitable rotatable component. Input member 102 is rotated by a prime mover. Exemplary prime movers include internal combustion engines, electric motors, hybrid power systems, and other suitable power systems. In one embodiment, the prime mover indirectly rotates the input member through a clutch and/or a torque converter. An exemplary output member 104 is an output shaft or other suitable rotatable component. Output member 104 provides rotational power to one or more working components. Exemplary working components include one or more drive wheels of a motor vehicle, a power take-off shaft, and other suitable devices. Output member 104 is rotated based on the interconnections of the operative transmission components of the transmission 100. By changing the interconnections of the operative transmission components, a rotation speed of output member 104 may be varied from a rotation speed of input member 102. An exemplary stationary member 106 is a housing of multi-speed transmission 100. The housing may include several components coupled together. In the exemplary embodiment shown in FIG. 1, input member 102 enters stationary member 106 at a first location or end 116 and output member 104 exits stationary member 106 at a second location or end 118.

Multi-speed transmission 100 includes at least one planetary gearset. In the exemplary embodiment of FIG. 1, multi-speed transmission 100 includes a plurality of planetary gearsets, illustratively a first planetary gearset 108, a second planetary gearset 110, a third planetary gearset 112, and a fourth planetary gearset 114. In another embodiment, additional planetary gearsets may be included. Further, although first planetary gearset 108, second planetary gearset 110, third planetary gearset 112, and fourth planetary gearset 114 are illustrated as simple planetary gearsets, it is contemplated that compound planetary gearsets may be included in some embodiments. Additionally, the arrangement of the plurality of planetary gearsets is exemplary.

First planetary gearset 108 includes a sun gear 120, a planet carrier 122 supporting a plurality of planet gears 124, and a ring gear 126. Second planetary gearset 110 includes a sun gear 130, a planet carrier 132 supporting a plurality of planet gears 134, and a ring gear 136. Third planetary gearset 112 includes a sun gear 140, a planet carrier 142 supporting a plurality of planet gears 144, and a ring gear 146. Fourth planetary gearset 114 includes a sun gear 150, a planet carrier 152 supporting a plurality of planet gears 154, and a ring gear 156.

Multi-speed transmission 100 further includes a plurality of selective couplers, illustratively a first selective coupler 162, a second selective coupler 164, a third selective coupler 166, a fourth selective coupler 168, a fifth selective coupler 170, and a sixth selective coupler 172. In the illustrated embodiment, first selective coupler 162, second selective coupler 164, and third selective coupler 166 are brakes and fourth selective coupler 168, fifth selective coupler 170, and sixth selective coupler 172 are clutches. The axial locations of the clutches and brakes relative to the plurality of planetary gearsets may be altered from the illustrated axial locations. In alternative embodiments, any number of clutches and brakes may be used.

Multi-speed transmission 100 includes several components that are illustratively shown as being fixedly coupled together. Input member 102 is fixedly coupled to sun gear 120 of first planetary gearset 108 and sun gear 130 of second planetary gearset 110. Output member 104 is fixedly coupled to ring gear 156 of fourth planetary gearset 114. Ring gear 126 of first planetary gearset 108, ring gear 136 of second planetary gearset 110, and sun gear 150 of fourth planetary gearset 114 are fixedly coupled together. Planet carrier 122 of first planetary gearset 108 is fixedly coupled to ring gear 146 of third planetary gearset 112. In alternative embodiments, one or more of the components fixedly coupled together are selectively coupled together through one or more selective couplers.

Multi-speed transmission 100 may be described as having eight interconnectors. Input member 102 is a first interconnector that both provides input torque and rotational motion to multi-speed transmission 100 and fixedly couples sun gear 120 of first planetary gearset 108 to sun gear 130 of second planetary gearset 110. Input member 102 is further fixedly coupled to sixth selective coupler 172. Output member 104 is a second interconnector that provides output torque and rotational motion from multi-speed transmission 100. A third interconnector 180 fixedly couples ring gear 126 of first planetary gearset 108, ring gear 136 of second planetary gearset 110, and sun gear 150 of fourth planetary gearset 114 together. Third interconnector 180 is further fixedly coupled to fourth selective coupler 168. A fourth interconnector 182 fixedly couples planet carrier 122 of first planetary gearset 108 to ring gear 146 of third planetary gearset 112. A fifth interconnector 184 fixedly couples planet carrier 132 of second planetary gearset 110 to fifth selective coupler 170. A sixth interconnector 186 fixedly couples planet carrier 152 of fourth planetary gearset 114, third selective coupler 166, fifth selective coupler 170, and sixth selective coupler 172 together. A seventh interconnector 188 fixedly couples planet carrier 142 of third planetary gearset 112 to first selective coupler 162 and to fourth selective coupler 168. An eighth interconnector 190 fixedly couples sun gear 140 of third planetary gearset 112 to second selective coupler 164. Each interconnector may include multiple components that are fixedly coupled together.

Multi-speed transmission 100 further includes several components that are illustratively shown as being selectively coupled together through selective couplers. By engaging various combinations of first selective coupler 162, second selective coupler 164, third selective coupler 166, fourth selective coupler 168, fifth selective coupler 170, and sixth selective coupler 172, additional components of multi-speed transmission 100 may be fixedly coupled together. Thus, the plurality of planetary gearsets and the plurality of selective couplers of multi-speed transmission 100 may be interconnected in various arrangements to provide torque and rotational motion from input member 102 to output member 104 in a plurality of forward gear or speed ratios and reverse gear or speed ratios. FIG. 1 is a representative view of an exemplary transmission. Additional details regarding the exemplary transmission are disclosed in U.S. patent application Ser. No. 15/483,027, the entirety of which is incorporated by reference.

Referring now FIGS. 2-5, an exemplary rotatable transmission component, illustratively, a planet carrier assembly 200 of a simple planetary gearset, is shown. While planet carrier 200 is part of a simple planetary gearset, it is contemplated that the structure discussed herein is applicable to other types of planetary gearsets such as for example, plus planetary gearsets, double planetary arrangements, and orbitless configurations.

Planet carrier assembly 200 is rotatable about an axis of rotation 202 and includes a base or planet carrier 204 supporting a plurality of planet gears 206 proximate an outer perimeter 208 of planet carrier 204. Planet carrier 204 includes a first mounting member 210, illustratively a ring-shaped cheek, spaced apart from a second mounting member 212, illustratively a ring-shaped cheek, along axis 202. In the exemplary embodiment shown, mounting member 210 is a disk-shaped body 214 having a first side 216 and a second side 218 opposite first side 216. Illustratively, second side 218 faces away from first side 216. Similarly, mounting member 212 is a disk-shaped body 220 having a first side 222 (see FIG. 5) and a second side 224 opposite first side 222. Illustratively, second side 224 faces away from first side 222.

In the exemplary embodiment shown, mounting member 212 includes a plurality of posts 226 extending from first side 222 and oriented parallel to axis 202. Posts 226 are circumferentially spaced apart from one another such that adjacent ones of posts 226 define a respective radial cavity 227. Radial cavities 227 are positioned circumferentially intermediate mounting members 210, 212 and extend longitudinally from second side 218 of mounting member 210 to first side 222 of mounting member 212. Illustratively, radial cavities 227 are spaced radially outwardly from axis 202. Posts 226 are illustratively brazed, friction, or laser welded to second side 218 of mounting member 210 thereby coupling mounting member 212 to mounting member 210. As a result, mounting members 210, 212 are immovable relative to one another and rotate about axis 202 together. It is contemplated, however, that posts 226 may be conventionally welded to mounting member 210.

In an alternative embodiment, mounting member 210 may include a plurality of posts extending from second side 218 and coupled to first side 222 of mounting member 212. In a further embodiment, mounting members 210, 212 may each include a plurality of posts coupled to the other of mounting members 210, 212. In another embodiment, mounting members 210, 212 may each include a plurality of posts coupled to one another at a location intermediate bodies 214, 220 of mounting members 210, 212. In a further embodiment, mountings members 210, 212 of planet carrier 204 are formed as a unitary piece through, for example, a three-dimensional additive manufacturing process. In other embodiments, planet carrier 204 includes a plurality of components removably coupled together. In other embodiments, mounting members 210, 212 are formed from a sand casting process using, for example, ductile iron.

Body 214 of mounting member 210 illustratively includes a central aperture 228 coaxial with axis 202 and configured to receive, for example, an interconnector or other operative transmission component such as a sun gear from either of axial directions 230, 232. Radial cavities 227 are spaced radially outwardly from central aperture 223 of body 214. First side 216 of body 214 includes a plurality of engagement features 234, illustratively splines, configured to engage complementary engagement features of an interconnector or operative transmission component. In the exemplary embodiment shown, engagement features 234 are spaced radially intermediate central aperture 228 and an outer perimeter 236 of body 214. Engagement features 234 are illustratively oriented radially inwardly towards central aperture 228. It is contemplated, however, that engagement features 234 may be oriented radially outwardly away from central aperture 228.

First side 216 of body 214 also includes a plurality of apertures 238 spaced radially intermediate engagement features 234 and outer perimeter 236 and spaced equally about central aperture 228. In addition, apertures 238 are positioned intermediate adjacent ones of posts 226 of body 220 of mounting member 212 and are open to a respective one of radial cavities 227. In addition, apertures 238 are illustratively through holes extending from first side 216 of body 214 to second side 218 of body 214. Illustratively, body 214 includes six apertures 238. In an alternative embodiment, body 214 may include more or fewer than six apertures 238.

Similarly, body 220 of mounting member 212 includes a central aperture 240 coaxial with axis 202 and central aperture 228. Central aperture 240 is configured to receive an interconnector or other operative transmission component from either of axial directions 230, 232. An outer perimeter 242 of body 220 includes a plurality of engagement features 244, illustratively helical gear teeth, oriented radially outwardly from body 220. More specifically, engagement features 244 are oriented on a radially outward surface 246 of body 220 and are configured to engage complementary engagement features of an operative transmission component such as, for example, a ring gear.

Body 220 further includes a plurality of apertures 248 positioned radially intermediate central aperture 240 and surface 246. Apertures 248 are also positioned intermediate respective ones of posts 226 and open to a respective one of radial cavities 227. Illustratively, apertures 248 are through holes extending from first side 222 of body 220 (see FIG. 5) to second side 224 of body 220. In addition, each of apertures 248 of mounting member 212 are coaxial and held in a fixed relationship with a respective one of apertures 238 of mounting member 210. Illustratively, body 214 includes six apertures 248. In an alternative embodiment, body 214 may include more or fewer than six apertures 248.

Figure 4:
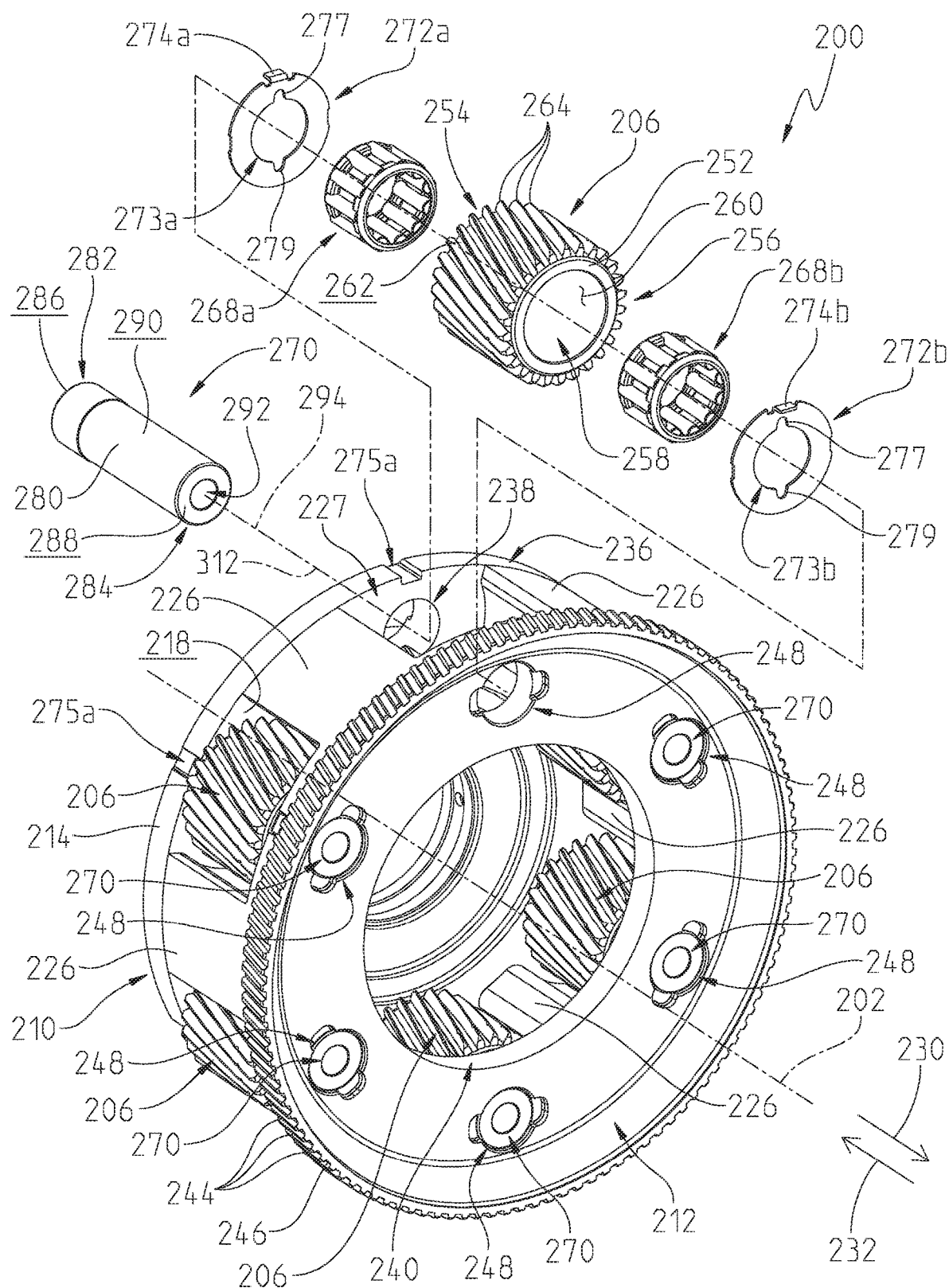
FIG. 4 is a partial exploded view of the planet carrier assembly of FIG. 2.
Figure 5:
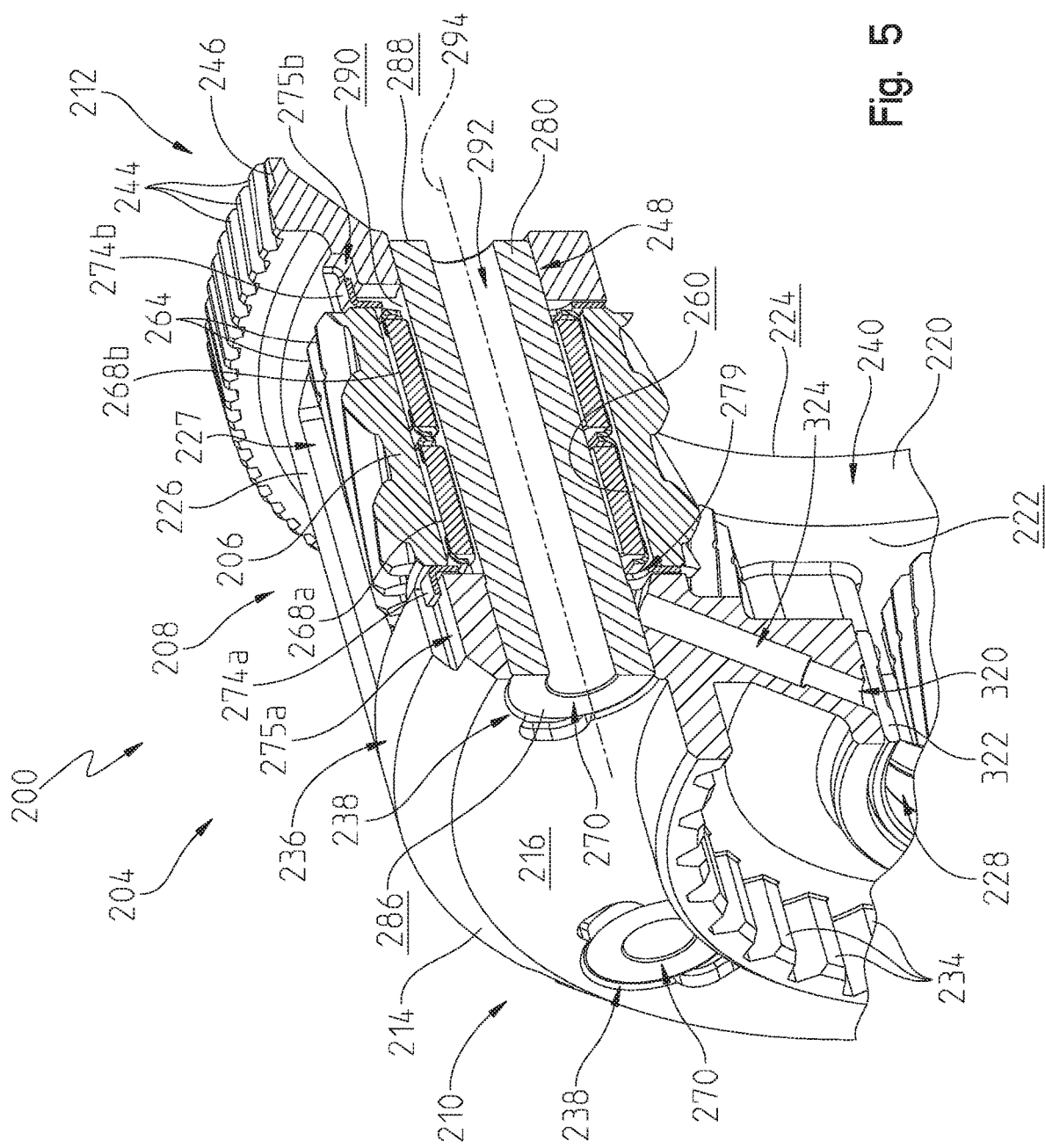
FIG. 5 is a partial cross-sectional view of the planet carrier assembly of FIG. 2.

Referring now to FIGS. 4 and 5, planet gears 206 are supported on a respective spindle 270, illustratively a stepped pin, within a respective one of radial cavities 227. Illustratively, each of planet gears 206 is supported for rotation about spindle 270 within the respective one of radial cavities 227. Planet gear 206 illustratively comprises a generally cylindrical body 252 extending longitudinally from a first end 254 to a second end 256 opposite first end 254. Body 252 includes a passageway 258 extending from first end 254 to second end 256 and having an interior surface 260. An exterior surface 262 of body 252 includes a plurality of engagement features 264, illustratively helical gear teeth, configured to engage complementary engagement features of an operative transmission component, such as, for example, a sun gear or a ring gear. Illustratively, planet carrier assembly 200 includes six planet gears 206. It is contemplated, however, that planet carrier assembly 200 may include more or fewer than six planet gears 206, but the number of radial cavities will be at least equal to the number of planet gears 206. In addition, spindles 270 may be used to pin mounting members 210, 212 together.

At least one bearing 268, illustratively bearings 268a, 268b, are received within passageway 258 against interior surface 260. Illustratively, bearing 268a is positioned within passageway 258 between first end 254 of planet gear 206 and bearing 268b. Similarly, bearing 268b is positioned within passageway 258 between bearing 268a and second end 256 of planet gear 206. Bearings 268 permit relative movement between planet gear 206 and spindle 270 on which bearings 268 and planet gear 206 are supported. In the exemplary embodiment shown, bearings 268 are a caged needle roller bearing. In other embodiments, bearings 268 are a no caged or loose needle roller bearing. In the event a loose needle roller bearing is used, a hardened spacer is positioned intermediate bearings 268a, 268b and multiple thrust washers may be required at each of ends 254, 256 of planet gear 206. In an alternative embodiment, no bearing is received within passageway 258 of planet gear 206 and planet gear 206 is supported directly on spindle 270 such that planet gear 206 and spindle 270 rotate together relative to mounting members 210, 212.

Planet carrier assembly 200 also includes a thrust washer 272, illustratively thrust washers 272a, 272b, positioned adjacent planet gear 206 and supported on spindle 270. More specifically, thrust washer 272a is positioned intermediate second side 218 of mounting member 210 and first end 254 of planet gear 206, and thrust washer 272b is positioned intermediate second end 256 of planet gear 206 and first side 222 of mounting member 212. Thrust washers 272a, 272b include a central aperture 273, illustratively, 273a, 273b, configured to receive spindle 270. Thrust washers 272a, 272b axially center and retain planet gear 206 on spindle 270 and axially retain bearings 268a, 268b within passageway 258 of planet gear 206. Each of thrust washers 272a, 272b include a retaining tab 274, illustratively retaining tabs 274a, 274b, that is received within a respective notch 275, illustratively notches 275a, 275b, of mounting members 210, 212. As a result, thrust washers 272a, 272b are fixed relative to mounting members 210, 212 (i.e., do not rotate). In an alternative embodiment, thrust washers 272a, 272b do not include a respective retaining tab 274. Thrust wasters 272a, 272b also include a pair of reliefs, illustratively reliefs 277, 279 (see FIG. 4), positioned circumferentially about central aperture 273. In the exemplary embodiment shown, relief 277 is positioned circumferentially adjacent a respective one of tabs 274a, 274b, and relief 279 is positioned circumferentially opposite the respective one of tabs 274, 274b. Locating retaining tabs 274a, 274b in the respective notch 275a, 275b, therefore, ensures thrust washers 272a, 272b are properly aligned relative to spindle 270 and mounting members 210, 212. Whether thrust washers 272a, 272b includes a respective retaining tab 274 is depend on how a lubricant is transmitted to planet gear 206 and bearings 268, 268b, as will be described in more detail herein. In other embodiments, planet carrier assembly 200 may include thrust needle roller bearings in place of thrust washers 272a, 272b.

Figure 6:
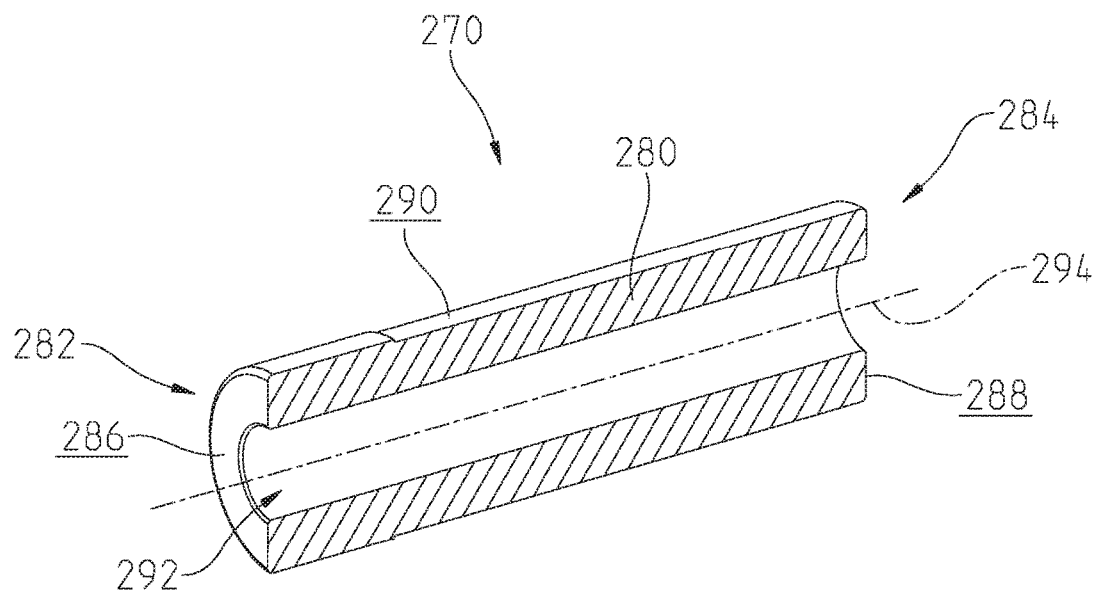
FIG. 6 is a perspective cross-sectional view of an illustrative spindle of the planet carrier assembly of FIG. 2.
Figure 7:
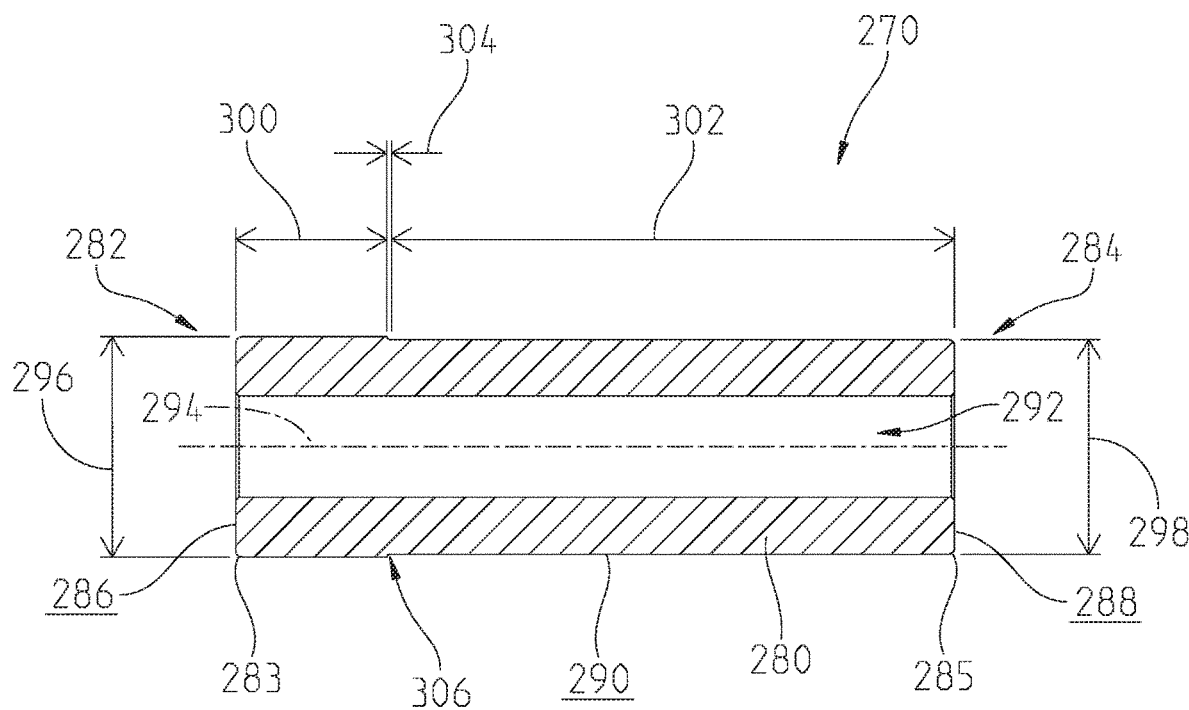
FIG. 7 is a cross-sectional view of the spindle of FIG. 6.

Each spindle 270 illustratively extends axially from a respective one of apertures 238 of mounting member 210 to a corresponding one of apertures 248 of mounting member 212. As shown in FIGS. 6 and 7, spindle 270 comprises a cylindrical body 280 extending axially from a first end 282 to a second end 284. Moreover, cylindrical body 280 of spindle 270 extends continuously from first end 282 to second end 284. First end 282 of body 280 includes a generally flat end surface 286, and second end 284 of body 280 includes a generally flat end surface 288. In embodiments, a material hardness of body 280 is continuous or uniform along its entire length. That is, a material hardness of body 280 intermediate ends 282, 284 is the same as a material hardness of ends 282, 284. In other embodiments, a material hardness of body 280 differs from a material hardness of ends 282, 284.

Bearings 268a, 268b and thrust washers 272a, 272b are supported on an outer surface 290 of body 280 of spindle 270. Body 280 also includes a passageway 292 extending axially along a length of body 280 from proximate first end 282 to proximate second end 284. In the exemplary embodiment shown, passageway 292 extends axially from first end 282 to second end 284 and is open to end surfaces 286, 288. In addition, passageway 292 is coaxial with a longitudinal axis 294 of body 280. In an alternative embodiment, passageway 292 may be radially offset from longitudinal axis 294 or extend axially from either of ends 282, 284 to a location of body 280 intermediate ends 282, 284. In one embodiment, passageway 292 may be configured to supply a lubricant to planet gear 206 or at least one of bearings 268a, 268b. In an alternative embodiment, a secondary passageway may extend from passageway 292 to outer surface 290 of body 280 to deliver the lubricant. Suitable lubricants include automatic transmission fluid ("ATF"). Illustratively, ATF includes transmission fluids ranging from SAE 90W to engine motor oils as well as low and ultra-low viscosity transmission fluids. Exemplary lubricants may both reduce friction between and cool moving parts. An additional advantage, among others, of passageway 292 is that an overall weight of spindle 270 may be reduced.

Referring specifically to FIG. 7, first end 282 of body 280 has an outer diameter 296, and second end 284 has an outer diameter 298. In the exemplary embodiment shown, outer diameter 296 of first end 282 is larger than outer diameter 298 of second end 284. In the exemplary embodiment shown, a ratio of diameter 296 to diameter 298 is between 1.0005 to 1.0015 and, more specifically, is 1.0010. It is contemplated, however, that the ratio of diameter 296 to diameter 298 may be larger than the range given above and may be dependent upon the application of planet carrier assembly 200. In addition to end 282, an axially extending region 300 of body 280 has outer diameter 296. Similarly, an axially extending region 302 of body 280 has outer diameter 298 in addition to end 284. A transition region 304 is positioned axially intermediate regions 300, 302 and corresponds to a change in the outer diameter of body 208 from diameter 296 to diameter 298. Illustratively, an axial length of region 300 is shorter than an axial length of region 302. In the exemplary embodiment shown, planet gear 206 and bearings 268a, 268b are supported for rotation on region 302 of body 280 of spindle 270. In addition, transition region 304 is a stepped transition 306 as the outer diameter of region 300 transitions sharply to the outer diameter of region 302. In an alternative embodiment, transition region 304 is a fillet or taper.

Outer diameter 296 of first end 282 of spindle 270 is sized and adapted to couple to a respective one of apertures 238 of mounting member 210 through an interference fit connection. Similarly, outer diameter 298 of second end 284 of spindle 270 is sized and adapted to couple to a respective one of apertures 248 of mounting member 212 through an interference fit connection. An interference fit connection, also known as a press fit or friction fit connection, is a coupling or connection of two parts that results from the friction therebetween after the two parts are pushed together. In an interference fit connection, an outer envelope of at least a portion of the insertion part is oversized relative to an inner envelope of at least a portion of the receiving part, the portion of the outer envelope of the insertion part contacting the portion of the inner envelope of the receiving part. Thus, the tightness of the interference fit connection is controlled by an amount of difference or overlap between the dimensions of the insertion part and the receiving part.

Additionally, the interference overlap between ends 282, 284 of spindle 270 and mounting members 210, 212 must be sufficient enough to prohibit relative motion between spindle 270 and mounting members 210, 212 at all targeted loads on and operating temperatures of planet carrier assembly 200 without exceeding the circumferential or hoop and shear stress limits and permitting spindle 270 to be removably from planet carrier 204. These operating parameters and design constraints will depend on the magnitude of the actual loads applied to planet carrier assembly 200 and the material of planet carrier 204 (e.g., powder metallurgy, steel, die casting, etc.).

In the exemplary embodiment shown, outer diameter 296 of first end 282 of spindle 270 is larger than inner diameter 308 of aperture 238, and outer diameter 298 is larger than inner diameter 310 of aperture 248. Outer diameter 296 of spindle 270 depends on the application in which planet carrier assembly 200 is used. For example, if planet carrier assembly 200 is used in defense or off-highway applications, outer diameter 296 of spindle 270 may be as large as 4 inches. For non-automotive applications such as, for example, windmills, outer diameter 296 of spindle 270 may be larger than 4 inches. For passenger vehicle applications, outer diameter 296 of spindle 270 may be as small as 0.25 inches. In the exemplary embodiment shown, outer diameter 296 of spindle 270 is 0.689 inches, and an inner diameter 308 of aperture 238 is 0.687 inches. Therefore, in the exemplary embodiment shown, the interference overlap between outer diameter 296 of first end 282 and inner diameter 308 of aperture 238 is 0.002 inches.

Similarly, outer diameter 298 of second end 284 is illustratively 0.671 inches, and an inner diameter 310 of aperture 248 is illustratively 0.670 inches. Therefore, the interference overlap between outer diameter 298 of second end 284 and inner diameter 310 of aperture 248 is 0.001 inches. It is contemplated, however, that other interference overlaps and outer diameters of ends 296, 298 of spindle 270, inner diameter 308 of apertures 238, and inner diameter 310 of apertures 248 may be used to establish a suitable interference fit connection. For example, the interference overlap may vary based on, among other things, the size of outer diameters 296, 298 of spindle 270. For example, larger outer diameters 296, 298 can tolerate a larger interference overlap than smaller outer diameters 296, 298. The interference overlap between the ends 282, 284 of spindle 270 and mounting members 210, 212 must be large enough, however, to prevent spindle 270 from backing out of mounting members 210, 212 during operation of planet carrier assembly 200.

Figure 8A:
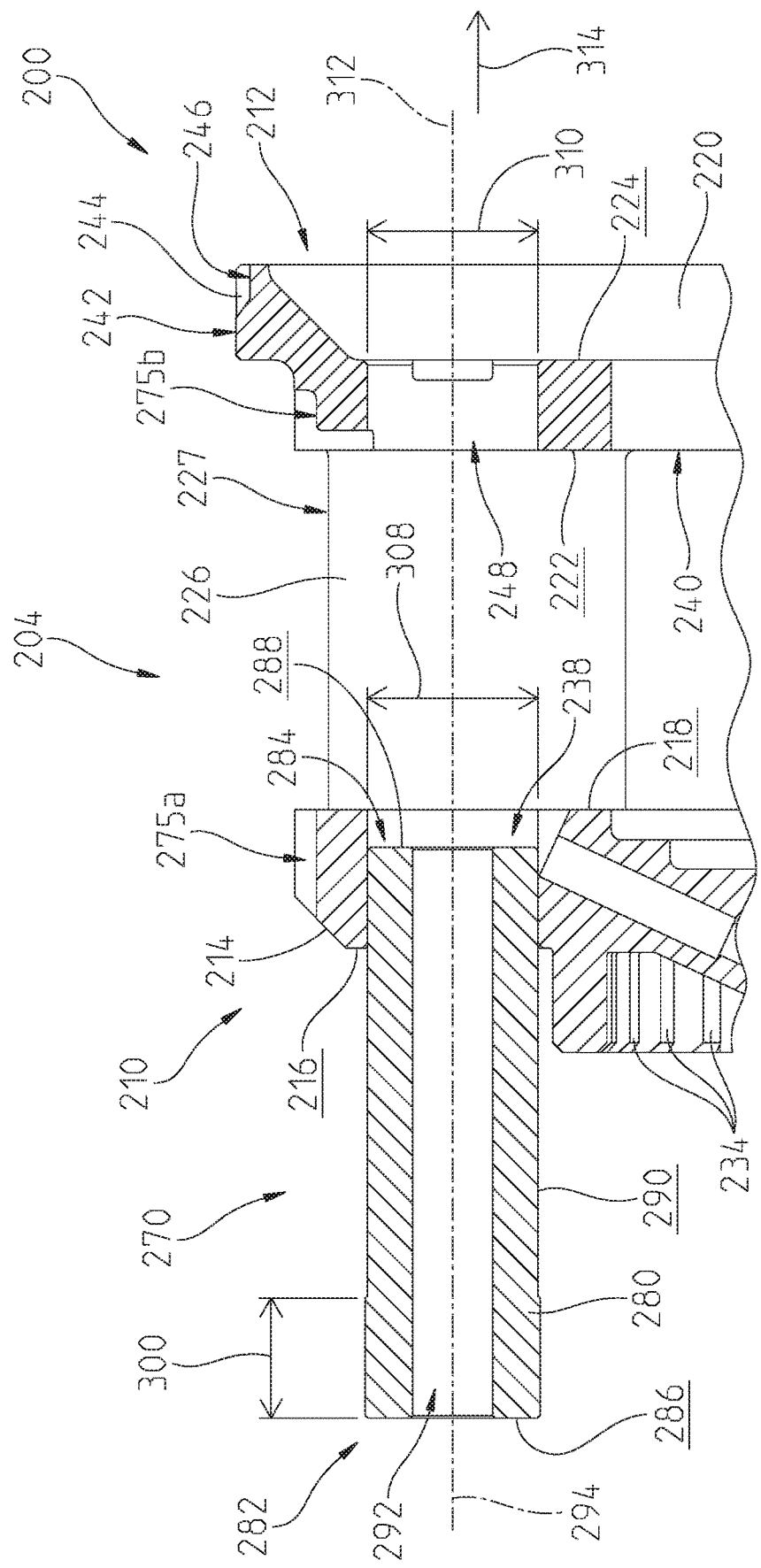
FIG. 8a is a partial cross-sectional view illustrating aligning and partially inserting a first end of the spindle into a first aperture of a base of the planet carrier assembly of FIG. 2.

Turning now to FIGS. 8a-8d, a method of assembling spindle 270 into planet carrier assembly 200 is shown, with the respective planet gear 206, bearings 268, and thrust washers 272 removed from radial cavity 227 for clarity. Referring initially to FIG. 8a, spindle 270 is aligned with apertures 238 of mounting member 210 and apertures 248 of mounting member 212. When spindle 270 is aligned with apertures 238, 248 of mounting members 210, 212, longitudinal axis 294 of spindle 270 is aligned with an insertion axis 312 that is coaxial with apertures 238, 248. An insertion force in an axial direction 314 is applied to first end 282 of spindle 270 to advance spindle 270 along insertion axis 312 in axial direction 314. As spindle 270 is advanced along insertion axis 312 in axial direction 314, second end 284 of spindle 270 enters aperture 238 of mounting member 210. Because outer diameter 298 of second end 284 is smaller than inner diameter 308 of aperture 238, second end 284 passes through aperture 238 without engaging aperture 238 in an interference fit connection. An advantage, among others, of sizing inner diameter 308 of aperture 238 of mounting member 210 larger than outer diameter 298 of second end 284 of spindle 270 is that second end 284 may be passed through aperture 238 without damaging outer surface 290 of spindle 270 on which bearings 268a, 268b are supported. To facilitate the alignment and insertion process, at least one of ends 282, 284 of spindle 270 may include a chamfered or beveled edge, illustratively edges 283, 285 (see FIGS. 6 and 7).

Figure 8B:
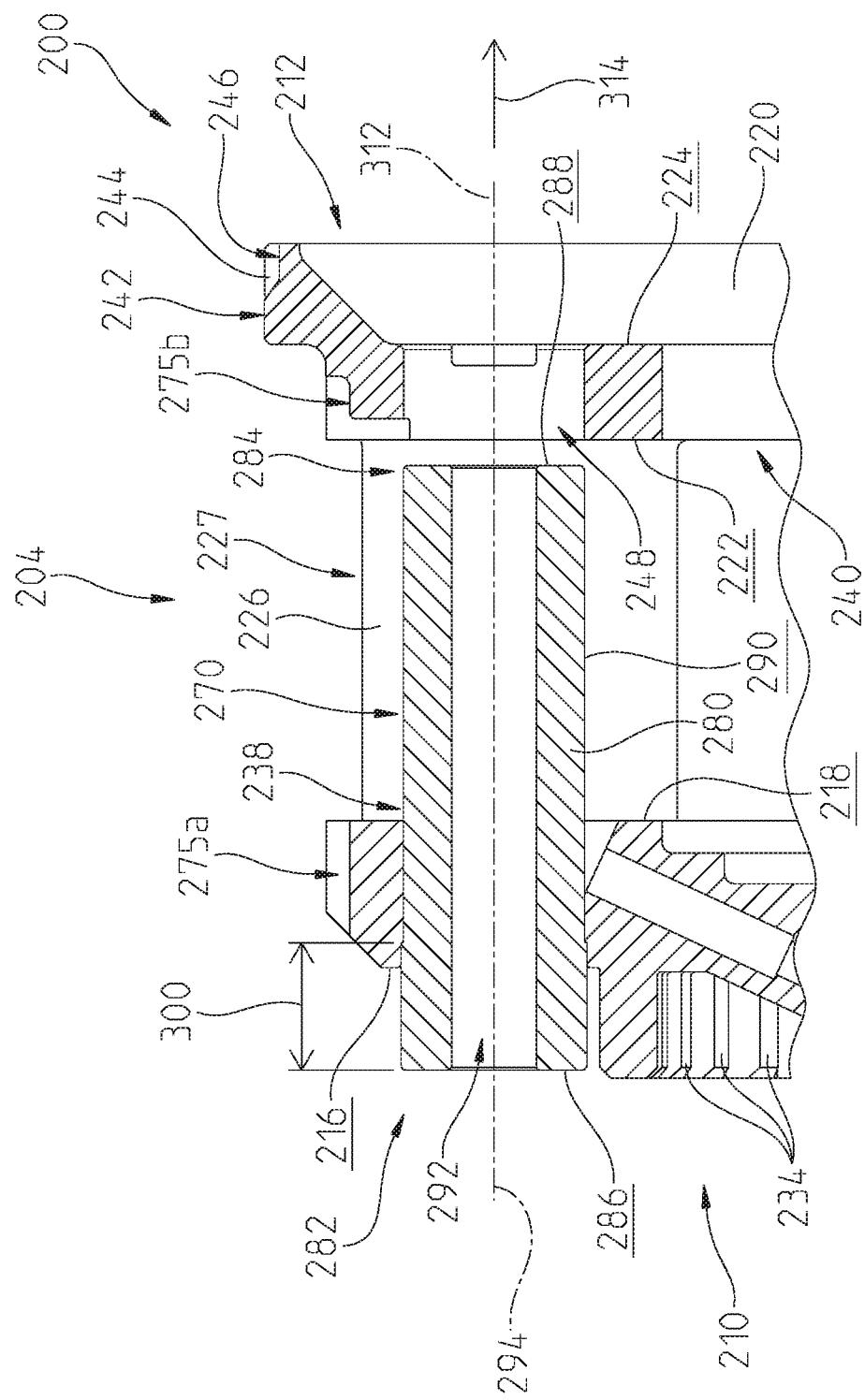
FIG. 8b is a partial cross-sectional view illustrating passing the spindle through the first aperture of the base of the planet carrier assembly of FIG. 2.

Referring now to FIG. 8b, spindle 270 has been further advanced along insertion axis 312 in axial direction 314 and into radial cavity 227 relative to FIG. 8a. Planet gear 206, bearings 268, and thrust washers 272 are positioned within radial cavity 227 and supported on spindle 270 as spindle 270 advances into radial cavity 227. Second end 284 of spindle 270 remains coaxial with aperture 248 of mounting member 214. As spindle 270 advances along insertion axis 312 in axial direction 314, region 300 of first end 282 of spindle 270 engages aperture 238 of mounting member 310 in an interference fit connection as outer diameter 296 of region 300 is larger than inner diameter 308 of aperture 238 of mounting member 210. Accordingly, a larger insertion force may be required to continue advancing spindle 270 along insertion axis 312 once the interference fit connection between first end 282 of spindle 270 and aperture 238 of mounting member 210 is established. Illustratively, first end 282 of spindle 270 directly engages aperture 238 without any intermediary components.

Figure 8C:
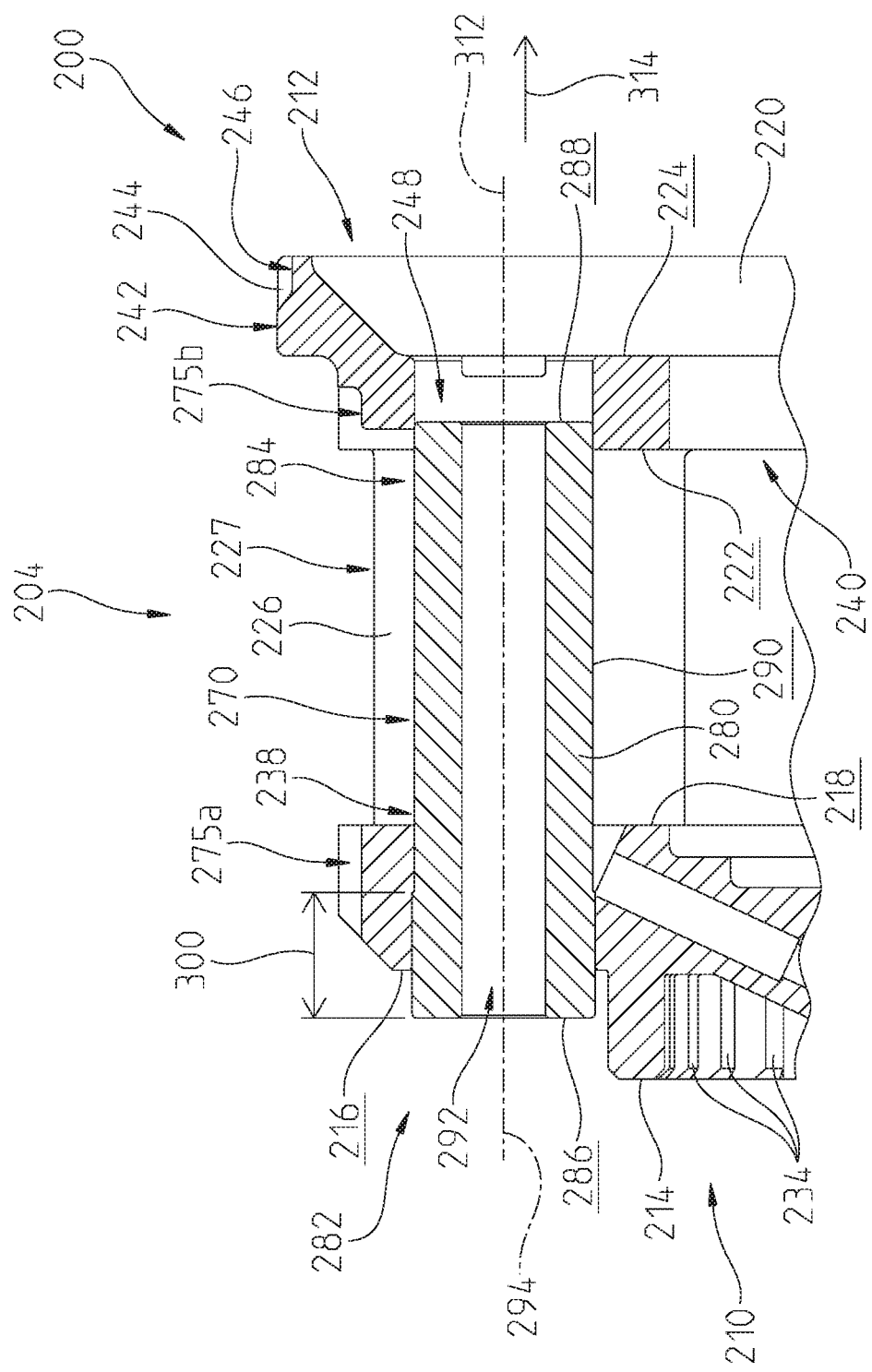
FIG. 8c is a partial cross-sectional view illustrating inserting the first end of the spindle into a second aperture of the base of the planet carrier assembly while inserting a second end of the spindle into the first aperture of the base of the planet carrier assembly of FIG. 2.

Referring now to FIG. 8c, spindle 270 has been further advanced along insertion axis 312 in axial direction 314 relative to FIG. 8b. More specifically, second end 284 of spindle 270 engages aperture 248 of mounting member 212 in an interference fit connection because outer diameter 298 of second end 284 is larger than inner diameter 310 of aperture 248 of mounting member 212. Illustratively, first end 282 of spindle 270 directly engages aperture 248 without any intermediary components. In addition, as spindle 270 advances further along insertion axis 312 in axial direction 314, region 300 is inserted further into aperture 238, and, as such, an insertion depth of first end 282 into aperture 238 increases. A larger insertion force may be required to continue advancing spindle 270 along insertion axis 312 once the interference fit connection between second end 284 of spindle 270 and aperture 248 of mounting member 212 is established.

Figure 8D:
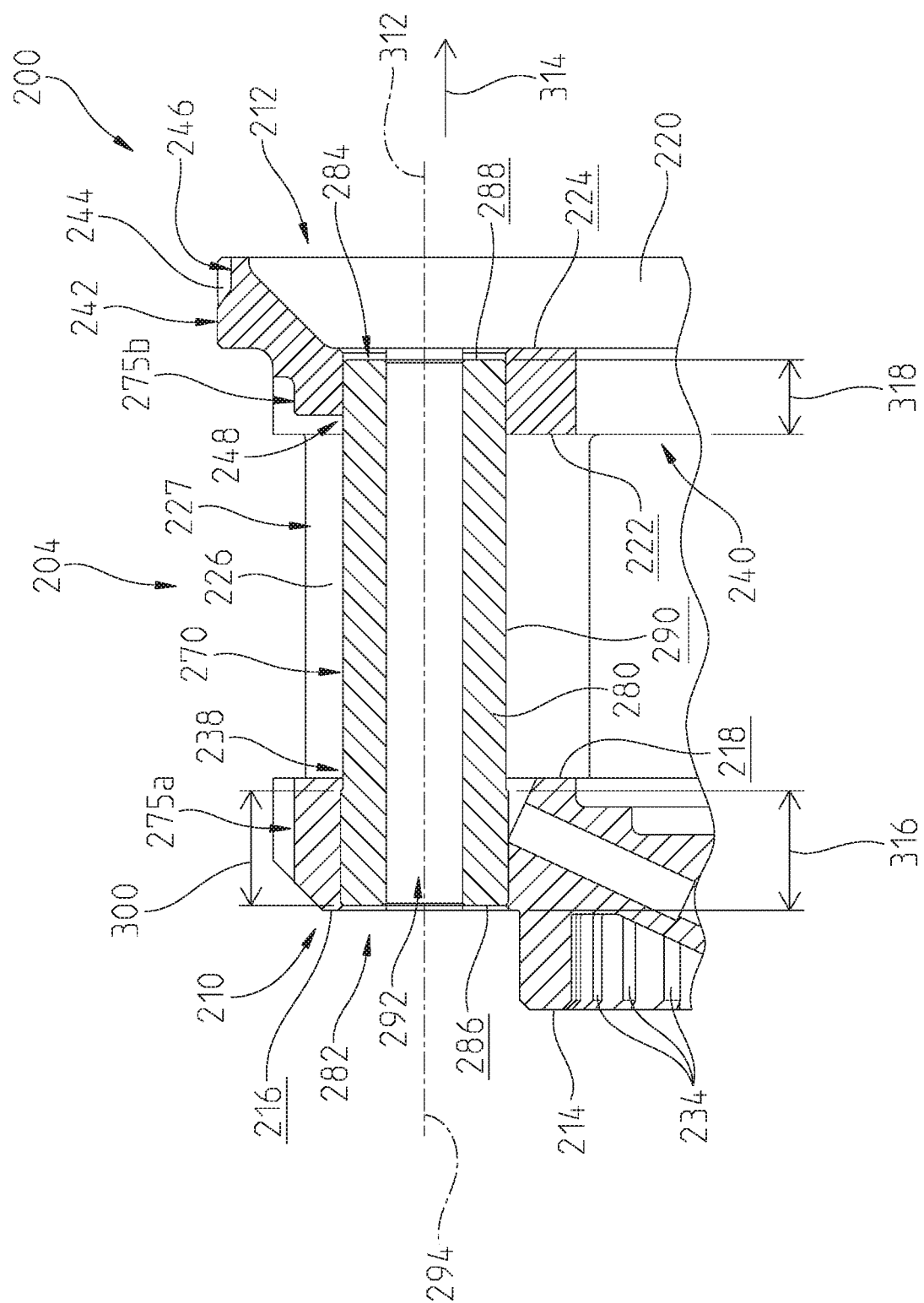
FIG. 8d is a partial cross-sectional view illustrating coupling the first end of the spindle to the second aperture of the base of the planet carrier assembly and coupling the second end of the spindle to the first aperture of the base of the planet carrier assembly of FIG. 2.

Referring now to FIG. 8d, spindle 270 has been fully inserted into planet carrier 204. More specifically, first end 282 of spindle 270 is inserted into aperture 238 to an insertion depth 316 measured from side 216 of mounting member 210. Second end 284 of spindle 270 is inserted into aperture 248 to an insertion depth 318 measured from side 222 of mounting member 212. Illustratively, insertion depth 316 corresponds to region 300 of spindle 270 wholly contained within apertures 238. Moreover, surface 286 of first end 282 of spindle 270 is positioned intermediate sides 216, 218 of mounting member 210 when first end 282 is fully inserted to insertion depth 316. In alternative embodiments, surface 286 of first end 282 may be aligned with or proud of side 216 of mounting member 210. Insertion depth 318 corresponds to surface 288 of second end 284 of spindle 270 positioned intermediate sides 222, 224 of mounting member 212. Illustratively, surface 288 is positioned axially closer to side 224 than side 222 of mounting member. In alternative embodiments, surface 288 of second end 284 may be aligned with or proud of side 224 of mounting member 212. In addition, it is contemplated that insertion depth 316 may be measured from side 218 of mounting member 210. Similarly, it is contemplated that insertion depth 318 may be measured from side 224 of mounting member 212. The insertion force required to insert spindle 270 into insertion depths 316, 318 varies depending on the tightness of the interference fit connection between spindle 270 and mounting members 210, 212. In one embodiment, the insertion force is 2000 newtons ("N").

When fully inserted, spindle 270 is coupled to planet carrier 204 only through the interference fit connection between spindle 270 and mounting members 210, 212. The difference in outer diameters 296, 298 of spindle 270 permit an increase in the tightness of the interference fit as compared to a spindle having a constant outer diameter along its length. As a result, an axial location of spindle 270 between mounting members 210, 212 is maintained only by the interference fit connections between spindle 270 and mounting members 210, 212. That is, neither an intermediary component, such as a flanged sleeve bearing, nor an axial retainer, such as a snap ring, is required to maintain the axial location of spindle 270 between mounting members 210, 212. An advantage, among others, of the interference connections is that an axial indexing or retaining feature, such as a shoulder or a flange, of apertures 238, 248 is not required to maintain the axial location of spindle 270 between mounting members 210, 212. Additionally, ends 282, 284 of spindle 270 do not require a plastic deformation process, such as swaging, to maintain the axial location of spindle 270 between mounting members 210, 212. Another advantage, among others, of the interference connections is that spindle 270 may be removed from mounting members 210, 212 without deforming spindle 270 or damaging outer surface 290 of spindle 270 by applying a force against end 284 of spindle 270 in an axial direction opposite axial direction 314. As a result, spindle 270 may be reused after it is pressed out of mounting members 210, 212 because outer surface 290 on which bearings 268a, 268b are supported is undamaged. In embodiments, additional fasteners or fastening methods, such as swaging, may be used to couple spindle 270 to one or both of mounting members 210, 212.

Figure 9:
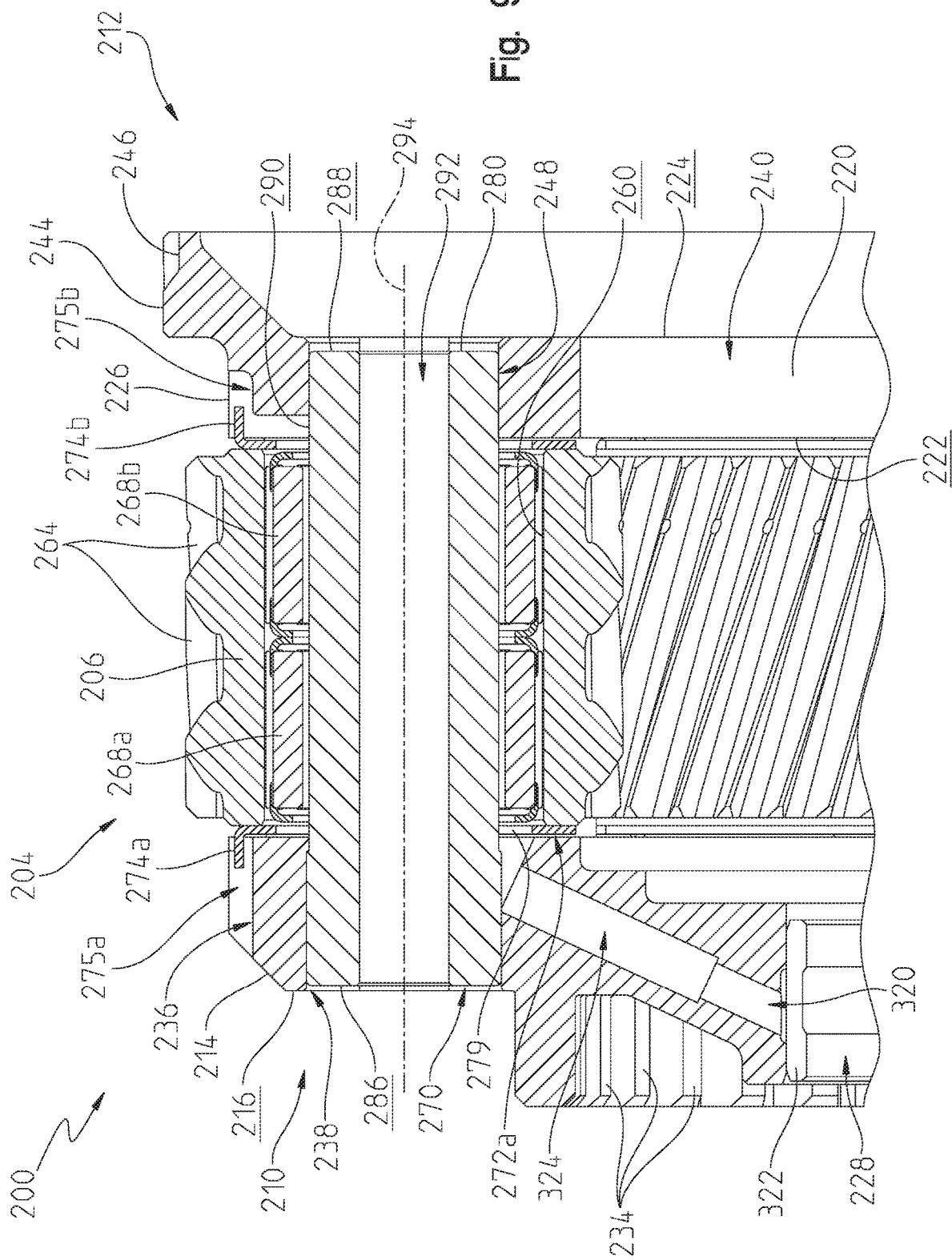
FIG. 9 is a partial cross-sectional view illustrating a lubricant delivery pathway for the planet carrier assembly of FIG. 2.

Turning now to FIGS. 9-12, the delivery of lubricant to planet gear 206 and bearings 268a, 268b is shown in more detail. Referring initially to FIG. 9, spindle 270 is fully inserted into planet carrier 204. Lubricant is delivered to an annular groove 320 of mounting member 210 through a bushing 322 housed within central aperture 228. Mounting member 210 includes a passageway 324 extending from annular groove 320 to aperture 238. The interference fit connection between first end 282 of spindle 270 and aperture 238 of mounting member 210 seals aperture 238 in axial direction 232 (see FIG. 4) and directs lubricant traveling through passageway 324 in axial direction 230 (see FIG. 4) out of aperture 238 at second side 218 of mounting member 210. This lubricant passes through relief 279 of thrust washer 272a, which is aligned with passageway 324, and along outer surface 290 of spindle 270 in axial direction 230 towards second end 284 of spindle 270. The lubricant traveling along outer surface 290 of spindle 270 is delivered to bearings 268a, 268b and planet gear 206. Lubricant may exit the assembly radially between either of thrust washers 272a, 272b or through ends 254, 256 of planet gear 206 and relief 277 of thrust waster 272b. Lubricant exiting through relief 277 of thrust washer 272b may exit planet carrier assembly 200 through notch 275b.

Figure 10:
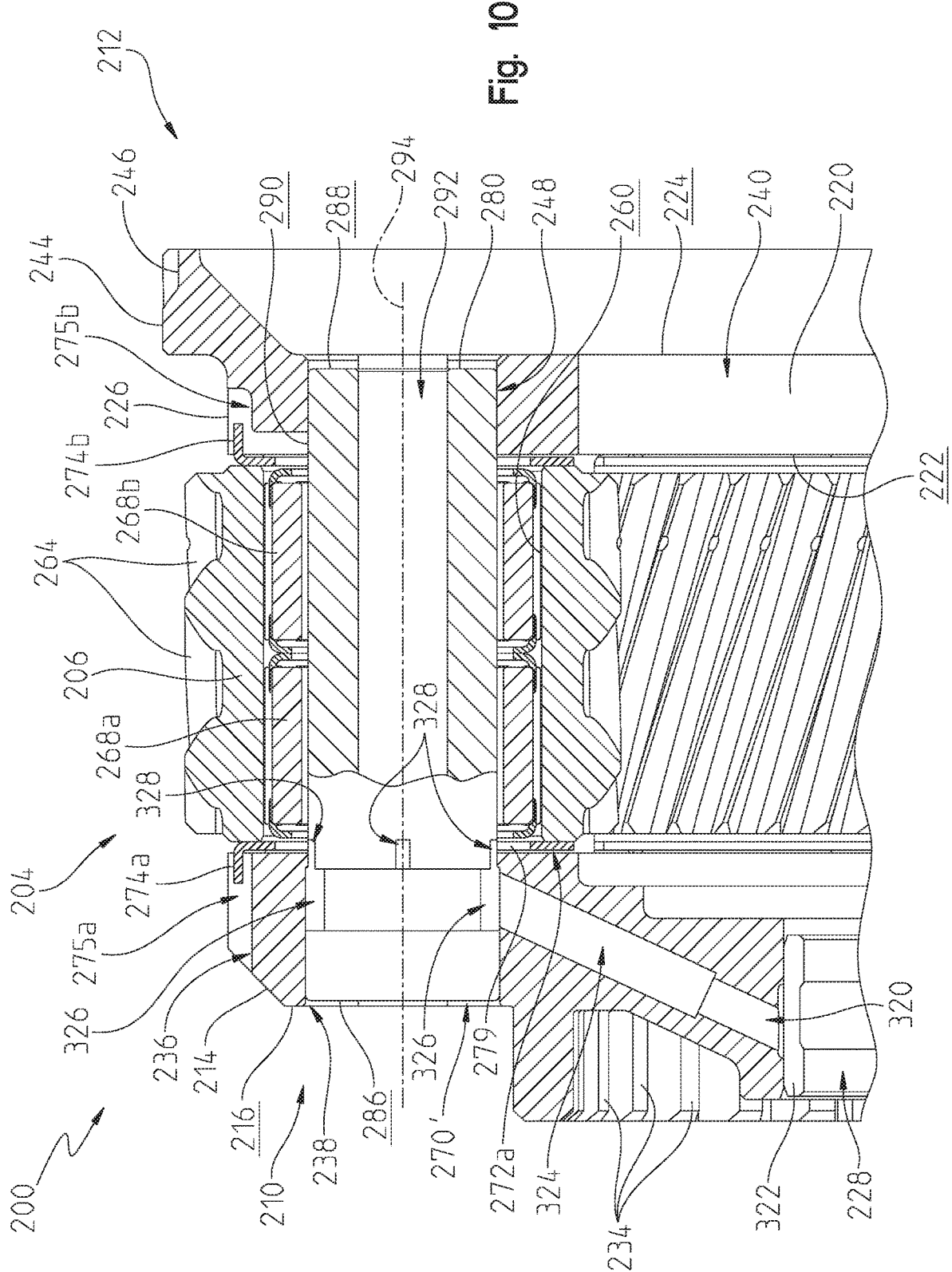
FIG. 10 is a partial cross-sectional view illustrating an alternative lubricant delivery pathway for the planet carrier assembly of FIG. 2.

In other embodiments, outer surface 290 of spindle 270 includes features configured to assist in delivering lubricant to bearings 268a, 268b and planet gear 206. Referring now to FIG. 10, an alternative spindle 270' is shown having a circumferential groove 326 positioned at first end 282 of spindle 270'. More specifically, circumferential groove 326 is positioned intermediate end surface 286 of spindle 270' and first end 254 of planet gear 206. Passageway 324 of mounting member 210 delivers lubricant, which is directed away from end 282 of spindle 270' as a result of the sealing interference fit connections between spindle 270' and mounting members 210, 212, to circumferential groove 326. In the exemplary embodiment shown, circumferential groove 326 is axially positioned wholly within aperture 238 of mounting member 210. Accordingly, circumferential groove 326 delivers the lubricant to a plurality of circumferential reliefs 328 in outer surface 290 of spindle 270'. Circumferential reliefs 328 are positioned axially intermediate circumferential groove 326 and first end 282 of planet gear 206 and are spaced circumferentially about outer surface 290. Circumferential reliefs 328 direct the lubricant axially along spindle 270' towards bearings 268a, 268b and planet gear 206. Specifically, circumferential reliefs 328 deliver lubricant to an axial location intermediate thrust washer 272a and bearing 268a. In the exemplary embodiment shown, spindle 270' illustratively includes four circumferential reliefs 328 spaced equally about outer surface 290 of spindle 270'. It is contemplated, however, that spindle 270' may include fewer or more than four circumferential reliefs 328.

Figure 11:
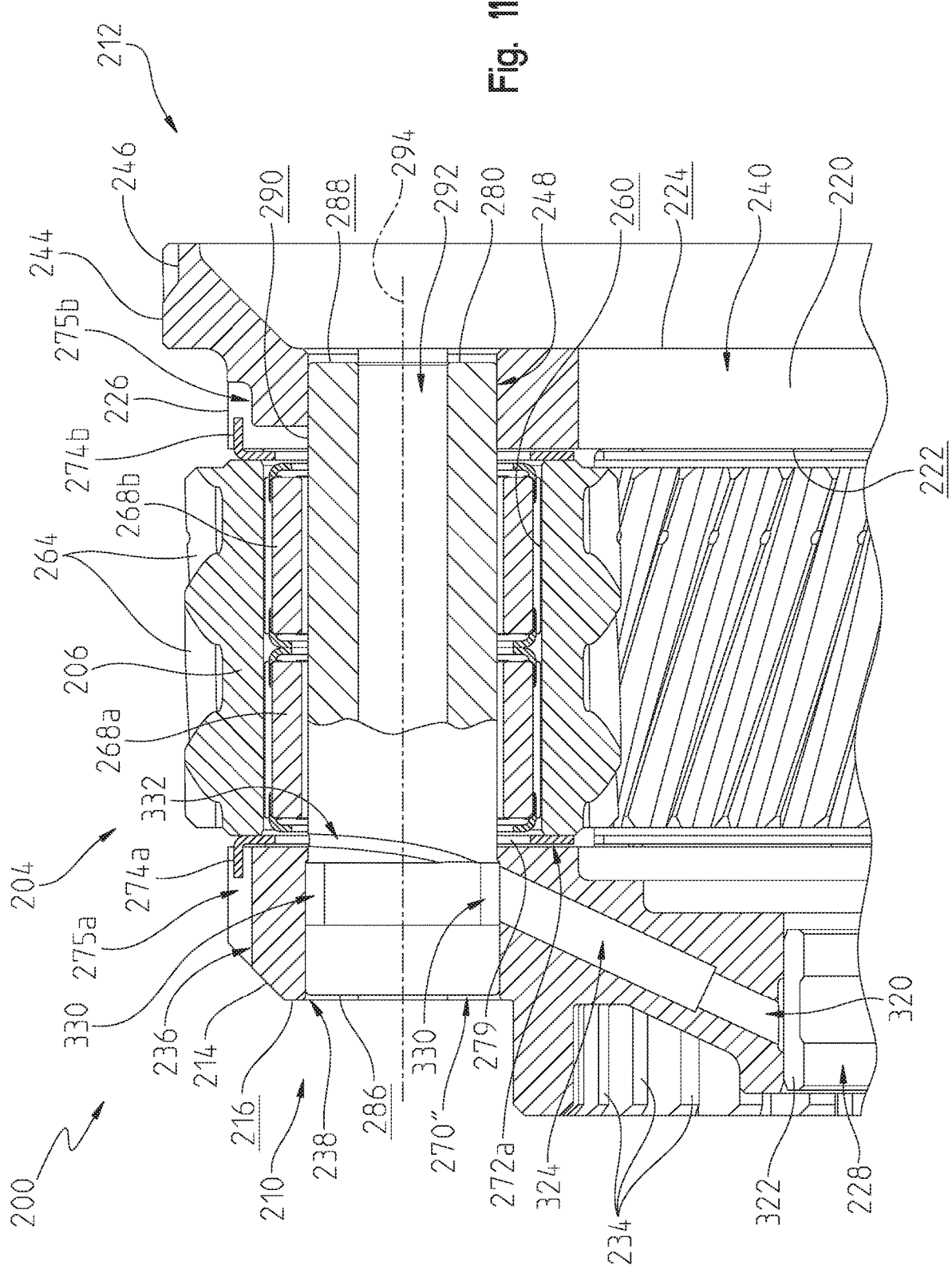
FIG. 11 is a partial cross-sectional view illustrating another alternative lubricant delivery pathway for the planet carrier assembly of FIG. 2.

Turning now to FIG. 11, another spindle 270" having features configured to assist in delivering lubricant to bearings 268a, 268b and planet gear 206 is shown. Similar to spindle 270', spindle 270" includes a circumferential groove 330 positioned at first end 282 of spindle 270". More specifically, circumferential groove 330 is positioned intermediate end surface 286 of spindle 270" and first end 254 of planet gear 206. Passageway 324 of mounting member 210 delivers lubricant, which is directed away from end 282 of spindle 270" as a result of the sealing interference fit connections between spindle 270" and mounting members 210, 212, to circumferential groove 330. In the exemplary embodiment shown, circumferential groove 330 is axially positioned wholly within aperture 238 of mounting member 210. Accordingly, circumferential groove 330 delivers the lubricant to a spiral groove 332 in outer surface 290 of spindle 270". Spiral groove 332 extends both circumferentially about outer surface 290 of spindle 270" and axially along a length of spindle 270". Spiral groove 332 directs the lubricant axially along outer surface 290 of spindle 270" towards bearings 268a, 268b and planet gear 206. Specifically, spiral groove 332 directs the lubricant to an axial location intermediate thrust bearings 272a and bearing 268a.

Figure 12:
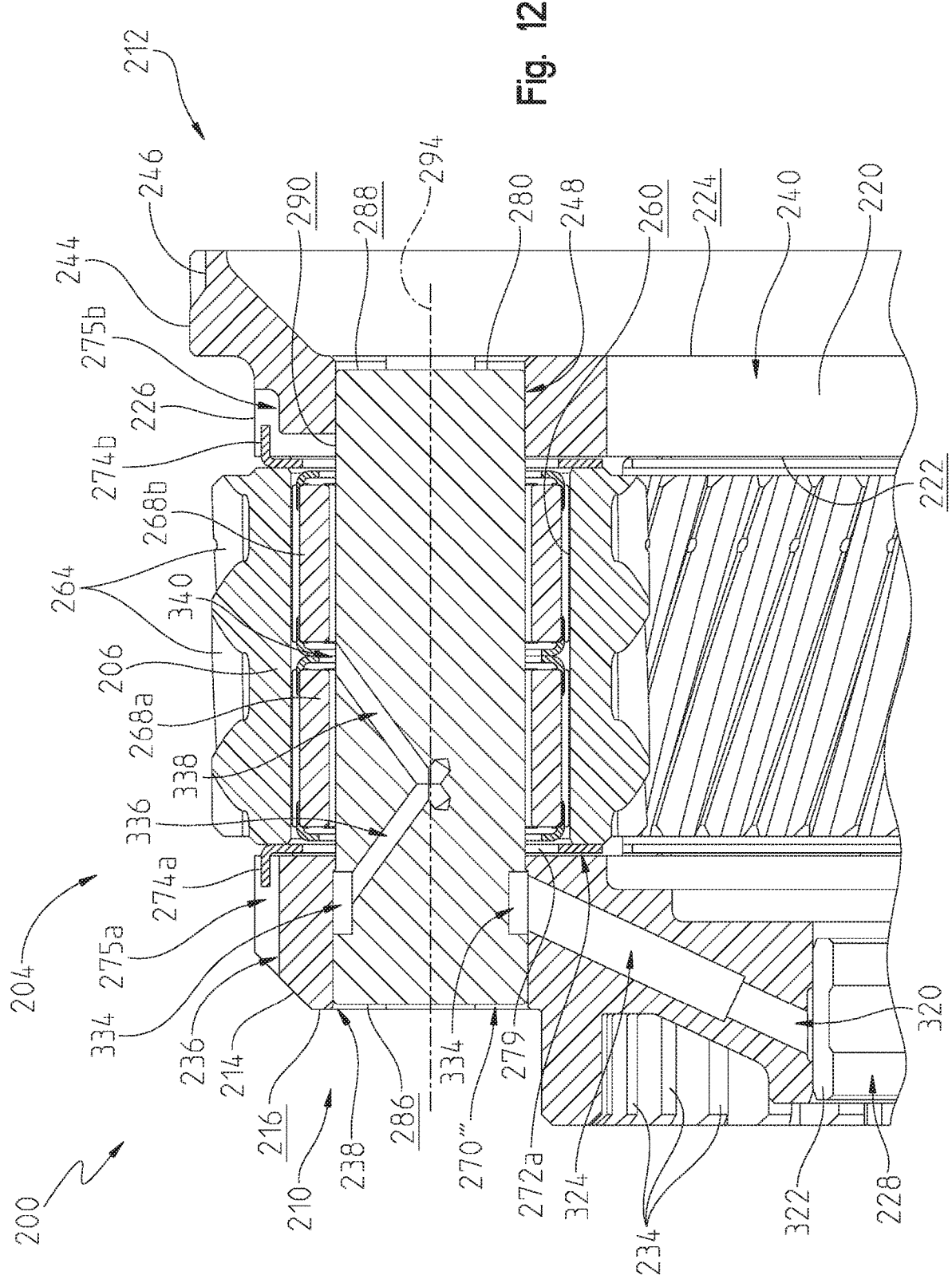
FIG. 12 is a partial cross-sectional view illustrating another alternative lubricant delivery pathway for the planet carrier assembly of FIG. 2.

Referring now to FIG. 12, another spindle 270''' having features configured to assist in delivering lubricant to bearings 268a, 268b and planet gear 206 is shown. Similar to spindle 270', spindle 270''' includes a circumferential groove 334 positioned at first end 282 of spindle 270'''. More specifically, circumferential groove 334 is positioned intermediate end surface 286 of spindle 270''' and first end 254 of planet gear 206 without axially extending fully to bearing 268a. Passageway 324 of mounting member 210 delivers lubricant, which is directed away from end 282 of spindle 270''' as a result of the sealing interference fit connections between spindle 270''' and mounting members 210, 212, to circumferential groove 334. In the exemplary embodiment shown, circumferential groove 334 is axially positioned wholly within aperture 238 of mounting member 210. Accordingly, circumferential groove 334 delivers lubricant to a first oil passageway 336 extending axially within body 280 of spindle 270''' toward second end 282 of spindle 270'''. Illustratively, lubricant passageway 336 is oriented toward and intersects longitudinal axis 294 of spindle 270'''. Lubricant passageway 336 intersects a second lubricant passageway 338 extending from longitudinal axis 294 of spindle 270''' to a location 340 of outer surface 290 of spindle 270''' intermediate bearings 268a, 268b. More specifically, lubricant passageway 338 delivers lubricant to a location of outer surface 290 of spindle 270''' between and not contacted by bearings 268a, 268b. In this way, bearings 268a, 268b may be fully supported outer surface 290 of spindle 270'''.

While this invention has been described as having exemplary designs, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A planetary gearset, comprising:
   a sun gear rotatable about a central axis;
   a planet carrier rotatable about the central axis and including a first mounting member spaced apart from a second mounting member, the planet carrier including a central aperture for receiving the sun gear and a plurality of radial cavities spaced radially outwardly from the central axis, the plurality of radial cavities defined between the first and second mounting members; and
   a plurality of planet gears individually supported in a respective radial cavity of the planet carrier, each of the plurality of planet gears supported on a respective spindle axially extending between the first and second mounting members of the planet carrier, the spindle extending continuously from a first end to a second end, the first end of the spindle including a first portion having a first diameter and coupled to the first mounting member through an interference fit connection with a corresponding aperture of the first mounting member, the second end of the spindle having a second diameter and coupled to the second mounting member through an interference fit connection with a corresponding aperture of the second mounting member, the first diameter larger than the second diameter, a ratio of the first diameter to the second diameter between 1.0005 to 1.0015; and a plurality of bearings, each bearing supported on the respective spindle and supporting a respective planet gear, each bearing being spaced from a respective first portion of the respective spindle.

2. The planetary gearset of claim 1, wherein a material hardness of the spindle is uniform from the first end to the second end.

3. The planetary gearset of claim 1, wherein each of the respective spindles includes an axially extending passageway.

4. The planetary gearset of claim 1, wherein each of the respective spindles includes a passageway extending axially along a length of the spindle from proximate either of the first or second ends, the passageway configured to supply a lubricant to the respective planet gear.

5. The planetary gearset of claim 1, wherein the spindle further includes a first axially extending region having the second diameter, the bearing supported for rotation on the first region of the spindle.

6. The planetary gearset of claim 1, wherein the first mounting member is coupled to the second mounting member.

7. The planetary gearset of claim 1, further comprising thrust washers positioned at each axial end of each respective planet gear, the thrust washers positioned to axially retain the bearing supported by the planet gear.

8. The planetary gearset of claim 7, wherein the first portion of the spindle having the first diameter is spaced from the thrust washers, whereby the first portion of the spindle having the first diameter does not functionally interact with the bearing.

9. The planetary gearset of claim 7, wherein the bearing is one of a no caged roller bearing and a loose needle roller bearing.

10. The planetary gearset of claim 1, wherein an entirety of a nearest bearing of the plurality of bearings is spaced from a stepped transition of each respective spindle.

11. The planetary gearset of claim 10, further comprising a thrust washer disposed in the space between the stepped transition and the nearest bearing.

12. The planetary gearset of claim 1, wherein a stepped transition is defined between the first and second diameters of the spindle, the stepped transition disposed within the first mounting member of the planet carrier.

13. The planetary gearset of claim 12, wherein:
the aperture of the first mounting member of the planet carrier comprises a first plurality of spindle apertures and the aperture of the second mounting member of the planet carrier comprises a second plurality of spindle apertures;
each of the plurality of radial cavities is defined between one of the plurality of first spindle apertures and an aligned one of the plurality of second spindle apertures of the first and second mounting members respectively; and
the stepped transition of the spindle is disposed within an axial extent of a respective one of the plurality of first spindle apertures of the first mounting member.

14. A rotatable transmission component, comprising:
a base having a first mounting member and a second mounting member spaced apart from the first mounting member, the first and second mounting members configured to rotate together about a central axis;

a spindle extending axially between the first and second mounting members, the spindle extending continuously from a first end to a second end, the first end of the spindle including a first portion having a first diameter and coupled to the first mounting member through an interference fit connection with a corresponding aperture of the first mounting member, the second end of the spindle having a second diameter and coupled to the second mounting member through an interference fit connection with a corresponding aperture of the second mounting member, the first diameter larger than the second diameter to define a ratio of the first diameter to the second diameter of between 1.0005 to 1.0015, wherein an axial location of the spindle between the first and second mounting members is maintained only by the interference fit connections between the spindle and the first and second mounting members.

15. The transmission component of claim 14, the spindle further includes a first axially extending region having the first diameter, a second axially extending region having the second diameter, and a transition region between the first and second regions.

16. The transmission component of claim 15, wherein an axial length of the first region is shorter than an axial length of the second region.

17. The transmission component of claim 15, wherein the first region is contained wholly within the corresponding aperture of the first mounting member.

18. The transmission component of claim 14, wherein
the first mounting member includes a first side and a second side opposite the first side of the first mounting member, the first and second sides of the first mounting member face away from one another;
the second mounting member includes a first side and a second side opposite the first side of the second mounting member, the first and second sides of the second mounting member face away from one another;
the first end of the spindle is positioned intermediate the first side and the second side of the first mounting member; and
the second end of the spindle is positioned intermediate the first side and the second side of the second mounting member.

19. The transmission component of claim 14, wherein a material hardness of the spindle intermediate the first and second ends is the same as a material hardness of the first and second ends.

20. The transmission component of claim 14, wherein the corresponding apertures of the first and second mounting members comprise through holes extending through a respective one of the first and second mounting members.

21. The transmission component of claim 14, wherein an entirety of a bearing is spaced from a stepped transition of the spindle.

22. The transmission component of claim 21, further comprising a thrust washer disposed in the space between the stepped transition and the bearing.

23. The transmission component of claim 14, wherein the spindle defines a stepped transition between the first and second diameters, the stepped transition disposed within the first mounting member.

24. The transmission component of claim 23, wherein:
the aperture of the first mounting member comprises a first plurality of spindle apertures and the aperture of the second mounting member comprises a second plurality of spindle apertures;

the spindle is received in one of the first plurality of spindle apertures and one of the second plurality of spindle apertures; and the stepped transition is disposed within an axial extent of a respective one of the plurality of first spindle apertures of the first mounting member.

25. The transmission component of claim 14, further comprising a bearing supported on the spindle, the bearing being in a non-overlapping relationship with the first portion of the spindle.

26. A method of assembling a rotatable transmission component, the method comprising:

providing a planet carrier configured to rotate about a central axis and having a first mounting member spaced apart from a second mounting member, the first and second mounting members each including an aperture, the respective apertures being coaxial;

providing a spindle extending continuously from a first end to a second end, the first end having a first diameter including a second portion and the second end having a second diameter, the first diameter larger than the second diameter, a ratio of the first diameter to the second diameter between 1.0005 to 1.0015;

passing the second end of the spindle through the aperture of the first mounting member along a spindle insertion axis;

inserting the first end of the spindle into the aperture of the first mounting member to a first insertion depth such that the first end of the spindle is coupled to the first mounting member through a first interference fit connection with the aperture of the first mounting member; and inserting the second end of the spindle into the aperture of the second mounting member to a second insertion depth such that the second end of the spindle is coupled to the second mounting member through a second interference fit connection with the aperture of the second mounting member.

27. The method of claim 26, wherein the first and second insertion depths are establishable only by the interference fit connection between the spindle and the respective aperture of the first and second mounting members.

28. The method of claim 26, wherein the first mounting member is immovable relative to the second mounting member prior to the passing and inserting steps.

29. The method of claim 26, further comprising inserting a planet gear along a planet gear insertion axis intermediate the first and second mounting in embers and passing the first end of the spindle through the planet gear prior to the inserting the first end of the spindle step, the planet gear insertion axis perpendicular to the spindle insertion axis.

30. The method of claim 26, wherein an entirety of a bearing is spaced from a stepped transition of the spindle.

31. The method of claim 30, wherein a thrust washer is disposed in the space between the stepped transition and the bearing.

32. The method of claim 26, wherein the spindle defines a stepped transition between the first and second diameters.

33. The method of claim 32, further comprising:

providing a bearing having a bearing aperture therethrough; and passing the second end of the spindle through the bearing aperture.

34. The method of claim 33, wherein the stepped transition is disposed within the aperture of the first mounting member, such that a portion of the first end defining the first interference fit connection is spaced from the bearing after the step of inserting the first end.

* * * * *

UNITED STATES PATENT AND TRADEMARK OFFICE
CERTIFICATE OF CORRECTION

| | | |
|---|---|---|
| PATENT NO. | : 11,428,310 B2 | |
| APPLICATION NO. | : 16/429598 | |
| DATED | : August 30, 2022 | |
| INVENTOR(S) | : Jorge F. Briceno, Isaac Mock and Douglas Burchett | |

It is certified that error appears in the above-identified patent and that said Letters Patent is hereby corrected as shown below:

In the Claims

Claim 29, Column 18, Line 13 please replace "in embers" with "members"

Signed and Sealed this
Twenty-first Day of May, 2024

Katherine Kelly Vidal
*Director of the United States Patent and Trademark Office*